United States Patent
Kurauchi

(10) Patent No.: US 7,743,400 B2
(45) Date of Patent: Jun. 22, 2010

(54) VIDEO DATA TRANSMISSION/RECEPTION SYSTEM IN WHICH COMPRESSED IMAGE DATA IS TRANSMITTED FROM A TRANSMISSION-SIDE APPARATUS TO A RECEPTION-SIDE APPARATUS

(75) Inventor: Nobukazu Kurauchi, Nagoya (JP)

(73) Assignee: Panasonic Corporation, Osaka (JP)

( * ) Notice: Subject to any disclaimer, the term of this patent is extended or adjusted under 35 U.S.C. 154(b) by 1490 days.

(21) Appl. No.: 10/618,474

(22) Filed: Jul. 11, 2003

(65) Prior Publication Data
US 2004/0073936 A1    Apr. 15, 2004

(30) Foreign Application Priority Data
Jul. 17, 2002    (JP) .............................. 2002-208711

(51) Int. Cl.
*H04N 7/173* (2006.01)
(52) U.S. Cl. .............................. 725/114; 725/90; 725/91
(58) Field of Classification Search .................. 348/720, 348/721; 374/240.13, 240.14; 725/32–36, 725/54, 87, 90, 114, 119, 120; 375/240.01–240.27
See application file for complete search history.

(56) References Cited

U.S. PATENT DOCUMENTS

| | | | |
|---|---|---|---|
| 5,602,592 A | | 2/1997 | Mori et al. |
| 5,650,829 A | * | 7/1997 | Sugimoto et al. ........... 348/699 |
| 5,887,110 A | | 3/1999 | Sakamoto et al. |
| 6,029,045 A | * | 2/2000 | Picco et al. .................... 725/34 |
| 6,031,574 A | * | 2/2000 | Muller .................. 375/240.12 |
| 6,031,575 A | * | 2/2000 | Suzuki et al. .......... 375/240.14 |
| 6,370,199 B1 | * | 4/2002 | Bock et al. ..................... 725/36 |
| 6,526,582 B1 | * | 2/2003 | Brodigan et al. .............. 725/87 |
| 6,738,980 B2 | * | 5/2004 | Lin et al. ....................... 725/88 |
| 7,100,183 B2 | * | 8/2006 | Kunkel et al. ................. 725/34 |
| 2001/0024472 A1 | * | 9/2001 | Sporer et al. ........... 375/240.16 |
| 2002/0147980 A1 | * | 10/2002 | Satoda ........................ 725/90 |

FOREIGN PATENT DOCUMENTS

| | | |
|---|---|---|
| EP | 0 948 205 | 10/1999 |
| JP | 09-018881 | 1/1997 |
| WO | 98/31114 | 7/1998 |
| WO | WO 03/007613 | * 1/2003 |

OTHER PUBLICATIONS

Wee, Susie J. et al.; "Splicing MPEG Video Stream in the Compressed Domain"; IEEE 1997, pp. 225-230.

* cited by examiner

*Primary Examiner*—Andrew Y Koenig
*Assistant Examiner*—James Leija

(57) ABSTRACT

When transmission of on-demand video data interrupts transmission of broadcast video data from a distribution server 17 to a user terminal 18, the distribution server 17 transmits substitute I frame data to the terminal 18 after on-demand video data transmission in complete and before resuming broadcast video data transmission. The user terminal 18 decodes and displays the substitute I frame data, and then uses the decoded substitute I frame data as a reference frame to decode and display the first several frames of broadcast video data received directly after resumption of transmission.

18 Claims, 12 Drawing Sheets

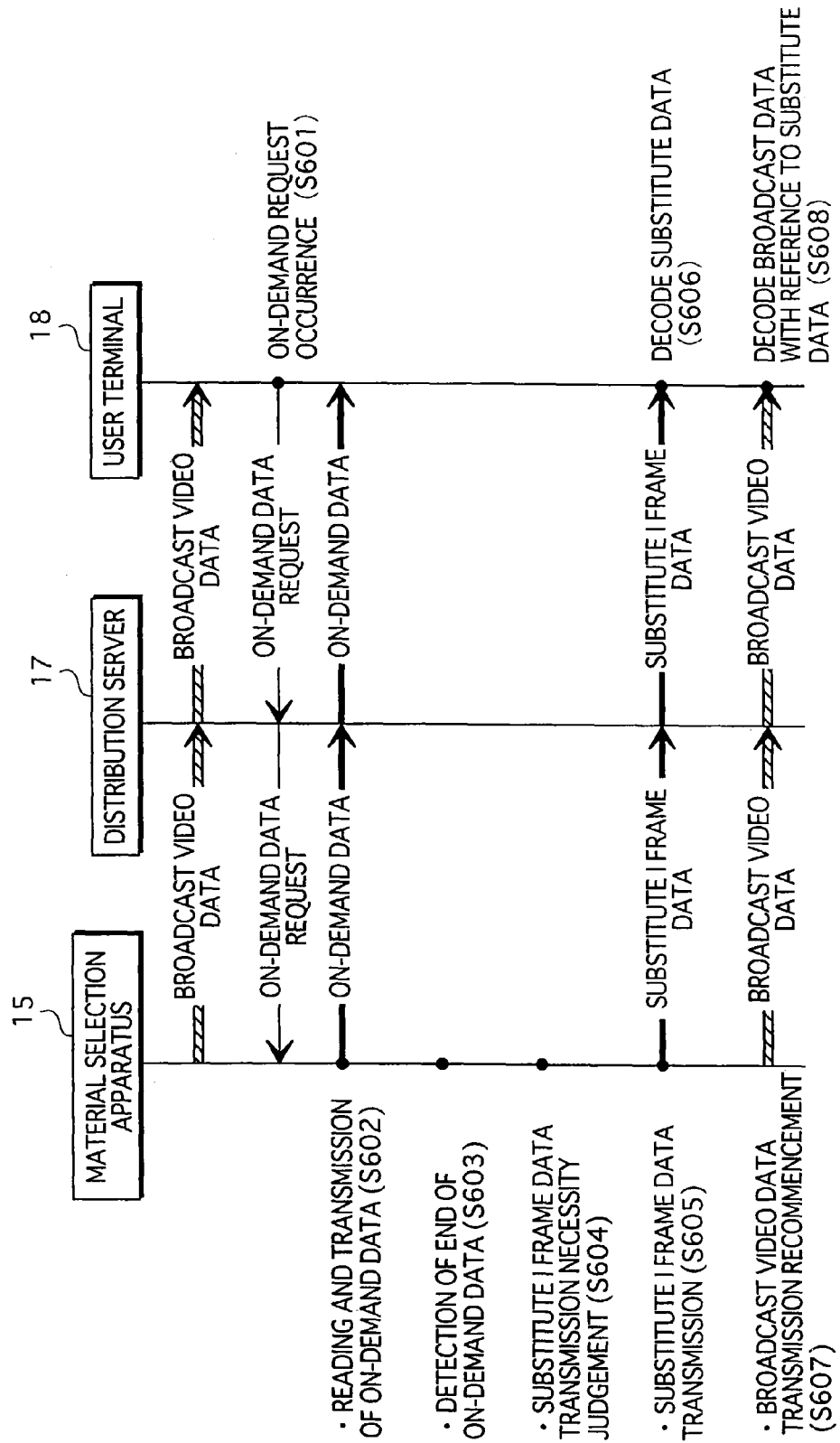

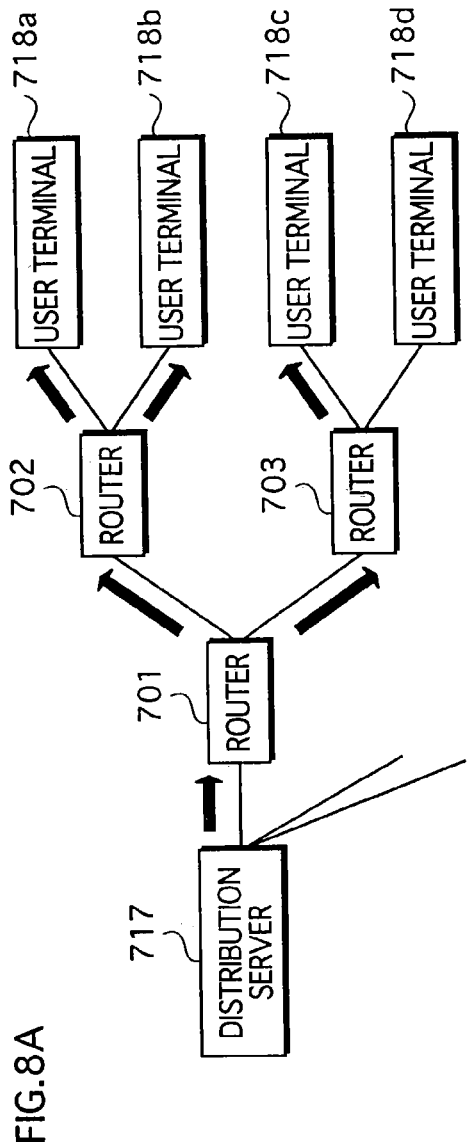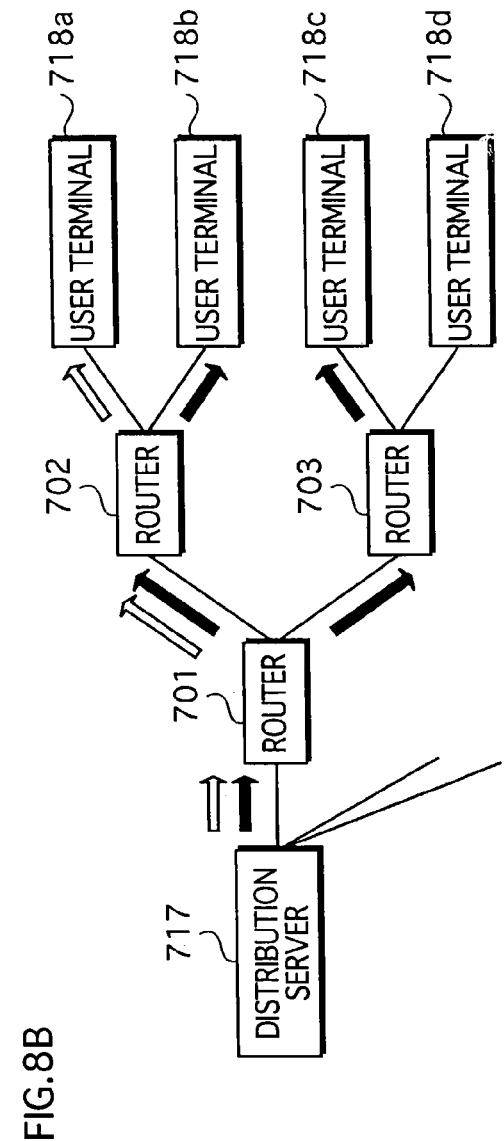

VIDEO DATA TRANSMISSION/RECEPTION SYSTEM IN WHICH COMPRESSED IMAGE DATA IS TRANSMITTED FROM A TRANSMISSION-SIDE APPARATUS TO A RECEPTION-SIDE APPARATUS

BACKGROUND OF THE INVENTION (1) Field of the Invention

The present invention relates a video data transmission/reception system composed of a transmission-side and a reception-side, and in which the transmission-side transmits image data that has been compressed using motion compensation interframe prediction to the reception-side, and the reception-side decodes and displays the video data.

(2) Related Art

In recent years services that provide video data to users over the Internet are becoming common with the spread of broadband networks such as ADSL and FTTH. This video data is provided in a compressed form in order to reduce the amount of data, and one of the commonly used methods for such compression is that specified by MPEG-4. In this method, the amount of data is compressed by encoding using combinations of intraframe/interframe encoding and motion compensation prediction.

One form of this kind of video data provision service is a broadcast-type service (in which a transmission-side apparatus distributes the same video data (broadcast video data) to a plurality of user terminals at the same time following a predetermined timetable). Data provision in a broadcast-type service is performed through either a broadcast or a multicast called one-to-many communication. Since individual processing for different users is unnecessary in this method, the number of user terminals that are transmitted to can be increased without extra load on the transmission-side apparatus.

However, services are being diversified, and one type of such diversification is on-demand-type data distribution where, in addition to simply distributing broadcast video data one-sidedly from the transmission-side apparatus, different video data is distributed to individual user terminals in response to individual requests from the user terminals (on-demand data distribution).

One example of such a service is, if the broadcast video data being transmitted is a sports program, transmitting to a particular user terminal past data relating to a particular player as appropriate, in response to a request from the user terminal.

There are a number of methods that can be used for treating broadcast video data when transmitting on-demand video data to a particular user terminal while transmitting broadcast video data.

One method is to continue to transmit broadcast video data to the user terminal while transmitting the on-demand video data. With this method the load on the user terminal is heavy because, in addition to the user terminal requiring sufficient communication band to be able to receive two types of video data simultaneously, the user terminal must also perform extra processing to decode the received video data, such as selective decoding and playing back. For this reason, it is common to use a method whereby transmission of the broadcast video data to the user terminal is interrupted during transmission of the on-demand video data, and only the on-demand video data is transmitted.

However, when transmission of broadcast video data is interrupted for a reason such as transmission of on-demand video data, the following problem arises directly after transmission of the broadcast video data resumes. Specifically, a period of time in which video is not displayed occurs because the user terminal is unable to decode the broadcast video data transmitted directly after resuming transmission. The cause of this lies in the video data compression method (motion compensation interframe prediction). The following describes how this problems arises, with reference to a drawing.

FIG. 1 is a schematic diagram showing how video data is received by a user terminal in Internet broadcasting in a case in which transmission of broadcast video data is interrupted and on-demand video data is transmitted. Here, reception of broadcast video data 111 is interrupted at a time t0, and on-demand video data 112 is received instead until a time t1. Reception of the broadcast video data is then resumed at the time t1. The broadcast video data 111 is compressed according to a method whereby one I frame (intraframe compressed frame) of 30 frame/sec video is provided every five seconds. Accordingly, one unit (GOP: Group of Picture) consists of 150 frames, one of which is an I frame. The ratio of I frames is low in Internet broadcasting compared to digital broadcasting (two I frames per second of 30 frame/sec video).

In FIG. 1, a GOP 1110 is the GOP in the broadcast video data 111 that is received over a period of time that includes the time t1. The GOP 1110 is composed of one I frame and a plurality of P and B frames, as are other GOPs. Each GOP is interframe encoded so that each P frame uses a nearest preceding I or P frame as a reference frame, and each B frame uses preceding and subsequent I or P frames as a reference frames.

Since transmission of the top three frames in the GOP 1110, which include the I frame, overlaps with transmission of the on-demand video data, the user terminal does not receive these three frames. For this reason, the fourth frame, which is a P frame encoded so as to use the head I frame as the reference frame, cannot be decoded. In addition, the P and B frames subsequent to the fourth frame are also unable to be decoded because they refer to the fourth frame. As a result, the video that corresponds to the P and B frames from the fourth frame onwards is not correctly displayed. This situation continues for as many as 149 frames' worth of broadcast video data (just under 5 seconds) if the broadcast video data has been encoded using the method where one I frame of 30 frame/sec broadcast video data is provided every 5 seconds (in the case of video data encoded at two I frames per second display stops for 14 frames' worth (just under 0.5 seconds)).

Possible ways of preventing this problem include (1) continuing transmission of broadcast video data during on-demand video data transmission, and having both types of video data decoded in parallel in the user terminal, and (2) having the transmission apparatus stagger transmission of the broadcast video data to the particular user terminal only, and reorganize and re-encode the GOP to include an I frame as the first frame directly after resumption, so that I frame data is always received first on resumption of transmission. However, the method described in (1) requires a wider band and increases the processing load of the user terminal, while the method described in (2) increases the load in the transmission-side apparatus because the apparatus must perform extra processing to treat the user terminal that receives the on-demand video data differently from other user terminals. This load increases as the number of user terminals that simultaneously receive on-demand video increases. This potentially leads to a problem of limiting the number of users who can be broadcast to simultaneously.

SUMMARY OF THE INVENTION

In view of the stated problem, the object of the present invention is to provide a video data transmission/reception system in which when video data, which has been encoded using motion compensation, must be decoded from part way through a GOP for the above-described reason, a reception-side user terminal is able to correctly decode and display the part of broadcast video data that occurs directly after transmission resumption (part way through the GOP), without greatly increasing the processing load on either the transmission side or the reception side.

In order to achieve the described object, the video data transmission/reception system of the present invention includes a transmission-side apparatus and a plurality of reception terminals, the transmission-side apparatus transmitting video data that has been compressed using motion compensation interframe prediction, and the reception terminals receiving the video data and decoding the received video data, wherein the transmission-side apparatus includes: a first encoding unit operable to apply intraframe encoding processing or interframe encoding processing to each of a plurality of frames of moving image data, to generate the video data; a second encoding unit operable to apply, in parallel with the encoding processing by the first encoding unit, intraframe encoding processing to a frame of the moving image data, to generate substitute I frame data; and a transmission unit operable to transmit the video data and the substitute I frame data to the plurality of reception terminals, wherein when the transmission unit is to resume transmission of the video data to one of the reception terminals after temporarily interrupting transmission of the video data to the reception terminal, the transmission unit transmits at least one frame's worth of the substitute I frame data to the reception terminal before resuming transmission of the video data, and the reception terminal, when the transmission unit is to resume the temporarily interrupted transmission of the video data, receives the transmitted substitute I frame data, decodes the received substitute I frame data, and uses the decoded substitute I frame data as reference frame data to decode video data that is received after resumption of transmission.

In this video data transmission/reception system, when resuming transmission of video data to the reception terminal that has temporarily stopped reception, if the frame data directly after resumption is an interframe encoded frame (a P frame or a B frame), substitute I frame data that has been generated separately by intraframe encoding the same frame is transmitted to the user terminal-side. The user terminal first decodes the substitute I frame data, and then decodes subsequent frame data using the decoded substitute I frame data as reference frame data. Accordingly, decryption can be performed correctly directly after resumption (part way through a GOP), and therefore video data display is not interrupted. Furthermore, there is no increase in the processing load of the user terminal, and the only increase in the processing load of the transmission-side apparatus is that for generating substitute I frame data and storing several frames' worth of the substitute I frame data. Even in a system in which video data is frequently stopped and resumed, the number of users to whom simultaneous broadcasting can be performed is not limited due to a processing load for stopping and resumption.

Note that the stated effect can be realized in the transmission-side apparatus, in other words in only a video data transmission apparatus, in such a system.

The transmission apparatus may further include: an option data transmission unit operable to transmit option video data to the reception terminal, in parallel with the transmission of the video data, wherein the interruption of video data transmission to the reception terminal is caused by the transmission of the option video data.

According to the stated structure, the stated effect can be achieved in a video data transmission/reception system in which is performed a service of simultaneously transmitting the same video data to multiple reception terminals as a broadcast, while interrupting transmission of the video data to one particular reception terminal with transmission of separate video data (option video data). Note that examples of option video data include on-demand video data and commercial video data.

Furthermore, the option data transmission unit may include an information collection sub-unit operable to collect, from each of one or more of the reception terminals, information about preferences of a user of the reception terminal, and based on the collected information, select contents of option data to be transmitted.

According to the stated structure, the stated effect can be realized in a video data transmission/reception system in which the structure on the side that provides the video data takes the initiative in transmitting option video data.

Furthermore, a structure is possible in which the transmission unit includes a broadcast transmission sub-unit operable to broadcast a same data to a plurality of transmission destinations; and an individual transmission sub-unit operable to transmit individual data to an individual transmission destination, and uses the broadcast transmission sub-unit to transmit the video data, and the individual transmission sub-unit to transmit the substitute I frame data, and the option data transmission unit transmits the option video data in an individual transmission manner. In this case, since the same video data is broadcast, there is no increase in the processing load of the transmission-side apparatus even if the number of reception terminals increases. In addition, if the transmission unit includes a switch sub-unit operable to exempt a reception terminal to which substitute I frame data or option video data is being transmitted from being a target of transmission of the video data by the broadcast transmission sub-unit, the reception terminal does not receive the broadcast video data simultaneously with the option video data or the substitute I frame data. Therefore, large increases in the load of the network and the processing load of the reception terminal can be avoided. Moreover, a possible structure is one in which the option data transmission unit includes an insertion sub-unit operable to transmit secondary option data part way through transmission of the option data; and a third encoding sub-unit operable, after transmission of the secondary option data ends and before transmission of the option data resumes, to generate option data substitute I frame data that corresponds to at least one frame of the option data starting from a frame that is a first frame after transmission resumption, wherein when transmission of the option data is to resume after the transmission of the secondary option data ends, the option data transmission unit transmits the option data substitute I frame data to the reception terminal before transmission of the option data resumes. If this structure is used, instead of option data being inserted in video data, option video data can be inserted in other option video data, and the stated effect can be achieved, i.e. the secondary option video data can be displayed directly after transmission resumption.

Furthermore, the first encoding unit and the second encoding unit may be realized in separate encoders.

According to the stated structure, there is no need for a special encoder that executes ordinary encoding processing according to motion compensation interframe prediction in parallel with intraframe encoding processing of all frames. Instead, the stated effect can be realized with conventional encoders, by providing two conventional encoders that perform the aforementioned types of encoding processing respectively.

Note that in order to achieve the stated effect, to determine exactly how many frames' worth of substitute I frame data to transmit, a structure may be used in which the transmission unit determines how many frames of substitute I frame data to transmit to the reception terminal before resuming transmission of the video data, based on a GOP structure of the video data, and in particular, based on a frequency of appearance of frames having an I attribute or a P attribute.

Furthermore, the same kind of effect can also be achieved according to a video data transmission apparatus that transmits video data that has been compressed using motion compensation interframe prediction to a plurality of reception terminals, including: a first encoding unit operable to apply intraframe encoding processing to a frame of moving image data, to generate intraframe encoded video data; a second encoding unit operable to apply interframe encoding processing to a frame of moving image data, to generate interframe encoded video data; a video data generation unit operable to generate the video data from the intraframe encoded video data and the interframe encoded video data; and a transmission unit operable to transmit the video data to the plurality of reception apparatuses, wherein when the transmission unit is to resume transmission of the video data to one of the reception terminals after temporarily interrupting transmission of the video data to the reception terminal, the transmission unit transmits at least one frame's worth of the intraframe encoded video data to the reception terminal as substitute I frame data before resuming transmission of the video data. In this case, the intraframe encoded data generated by the first encoding unit is used as the substitute I frame data.

Furthermore, the video data transmission/reception system of the present invention can be realized by a video data transmission/reception system including a plurality of video data provision apparatuses, a plurality of reception terminals, and a distribution server, the video data provision apparatuses transmitting video data that has been compressed using motion compensation interframe prediction, each reception terminal receiving the video data from any one of the video data provision apparatuses and decoding the received video data, and the distribution server conveying the video data between the video data provision apparatuses and the reception terminals, wherein each video data provision apparatus includes: a first encoding unit operable to apply intraframe encoding processing or interframe encoding processing to each of a plurality of frames of moving image data, to generate the video data; and a second encoding unit operable to apply, in parallel with the encoding processing by the first encoding unit, intraframe encoding processing to each of a plurality of frames of the moving image data, to generate substitute I frame data, and the distribution server includes: a switch request reception unit operable to receive a request from one of the reception terminals to switch video data received by the reception terminal to different video data; and a switch transmission unit operable, on the switch request reception unit receiving the request, to stop transmission of the video data being transmitted to the request-originating user terminal, obtain substitute I frame data from a video data provision apparatus that is to provide the different video data, transmit the obtained substitute I frame data to the user terminal, and transmit the different video data to the user terminal.

According to this video data transmission/reception system, in which is performed a service of simultaneously transmitting as broadcasts a plurality of broadcast data that can be selected by multiple reception terminals, the reception terminal side apparatus is able to correctly decode broadcast video data even directly after a switch from other broadcast data (part way through a GOP). Furthermore, neither the transmission-side apparatus nor the reception-side apparatus is subject to a large increase in processing load.

Furthermore, according to an encoder that compresses moving image data using motion compensation interframe prediction, including: a first encoding unit operable to apply intraframe encoding processing or interframe encoding processing to each of a plurality of frames of moving image data, to generate the video data; and a second encoding unit operable to apply, in parallel with the encoding processing by the first encoding unit, intraframe encoding processing to each of a plurality of frames of the moving image data, to generate substitute I frame data, if the encoded data of an I frame that is a reference frame is not sent correctly to the apparatus on the side the performs decoding, the substitute I frame data can be used instead of the I frame data that was not correctly sent, and therefore the I frame and subsequent frames that use the I frame as a reference frame can be decoded correctly. The stated effect can be achieved if this encoder is applied to a system in which video data is transmitted/received as a broadcast.

Furthermore, the stated effect can be realized by an encoder that compresses moving image data using motion compensation interframe prediction, including: a first encoding unit operable to apply intraframe encoding processing to a frame of moving image data, to generate intraframe encoded video data; a second encoding unit operable to apply interframe encoding processing to a frame of moving image data, to generate interframe encoded video data; an encoded video data generation unit operable to generate encoded video data from the intraframe encoded video data and the interframe encoded video data; and a substitute data generation unit operable to generate substitute I frame data from the intraframe encoded video data.

Furthermore, the described effects can also be achieved by a video data transmission/reception method that a system with the above-described structure executes, or by a program that has executed in a computer operations that correspond to the apparatuses having the described structure.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 7 is a sequence diagram showing the flow of video data transmission/reception processing in the embodiment;

FIGS. 8A and 8B show a structures related to the embodiment when routers are used;

DESCRIPTION OF THE PREFERRED EMBODIMENTS

The following describes an embodiment of the video data transmission/reception system of the present invention with reference to the drawings.

<Outline>

Figure 1:
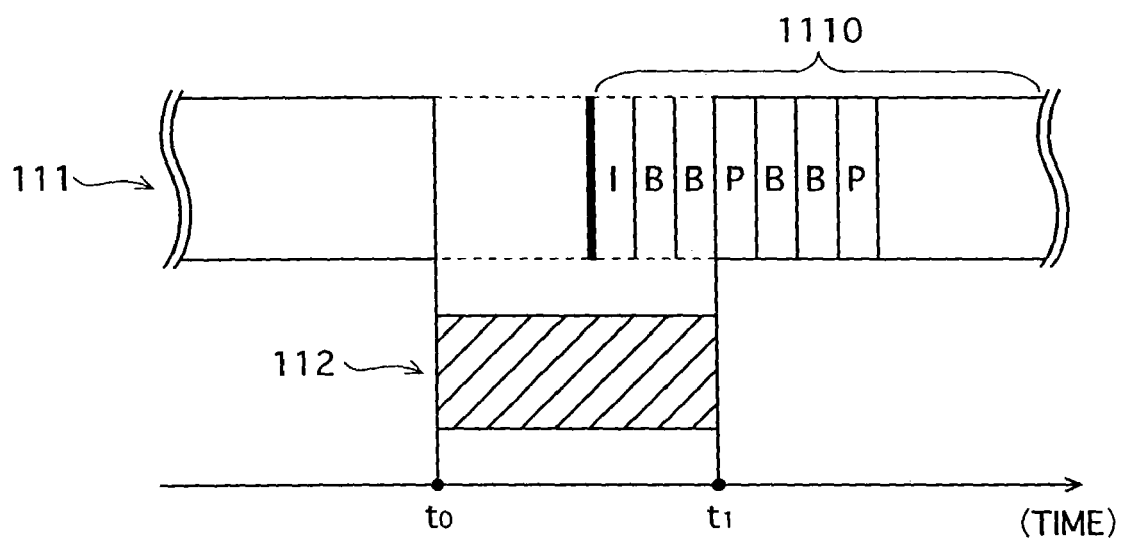
FIG. 1 is a schematic diagram showing a reception state of various types of data in the prior art.
Figure 2:
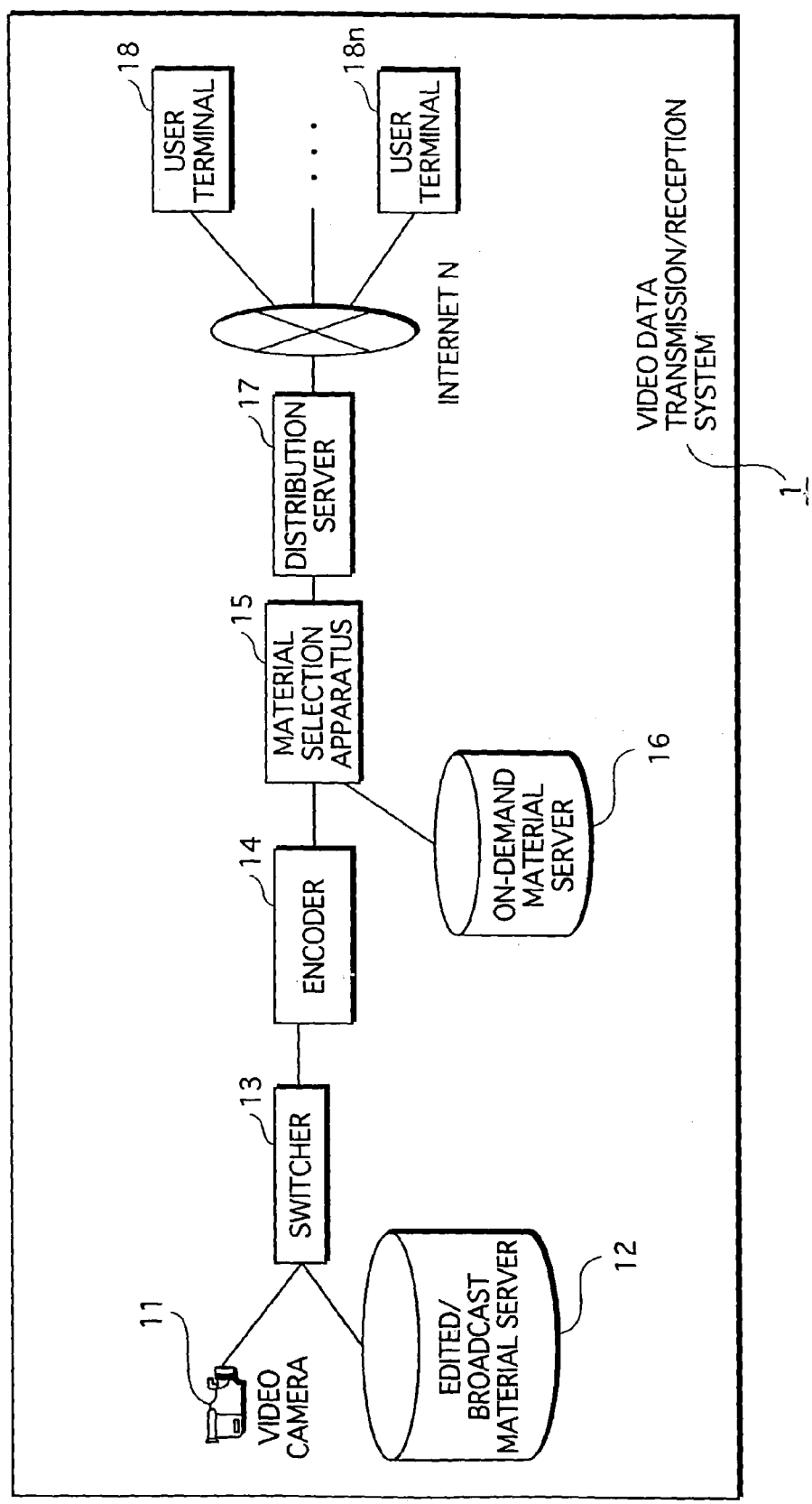
FIG. 2 is a structural diagram of an embodiment of the video data transmission/reception system of the present invention.

FIG. 2 shows the structure of a video data transmission/reception system 1 of the present embodiment. In the video data transmission/reception system 1, video data is transmitted in broadcast form from a video data transmission origin via the Internet N to a user terminal 18 that wishes to receive the video data. Transmission in broadcast from denotes transmitting the same video data simultaneously to all users terminals that wish to receive the video data, following a timetable of which users have been notified in advance. Hereinafter, video data that is transmitted in broadcast from is referred to as "broadcast video data". That is to say that here the term "broadcast" in broadcast video data does not mean transmission/reception using broadcast waves.

Furthermore, in addition to broadcast video data, the video data transmitted and received in the video data transmission/reception system 1 includes video data that is transmitted only when a request is issued for the video data, to a particular user terminal that has made the request. This video data is called "on-demand video data". Transmission of broadcast video data to the particular user terminal is interrupted while the on-demand video data is being transmitted (but broadcast video data continues to be transmitted to other user terminals). When transmission/reception of the on-demand video data is complete, transmission of broadcast video data to the particular user terminal resumes.

The video data transmission/reception system 1 enables the user terminal to correctly decode and play back broadcast video data directly after transmission is resumed, from the point of resumption of transmission of broadcast video data as described above. To this end, the characteristic of the video data transmission/reception system 1 lies in substituting frame data of P frames or B frames that occur directly after resumption with I frame data that has been intraframe encoded separately from the same frames (substitute I frames).

The following describes a specific example of transmission and reception of video data including substitute I frame data, with reference to the drawings.

Figure 3:
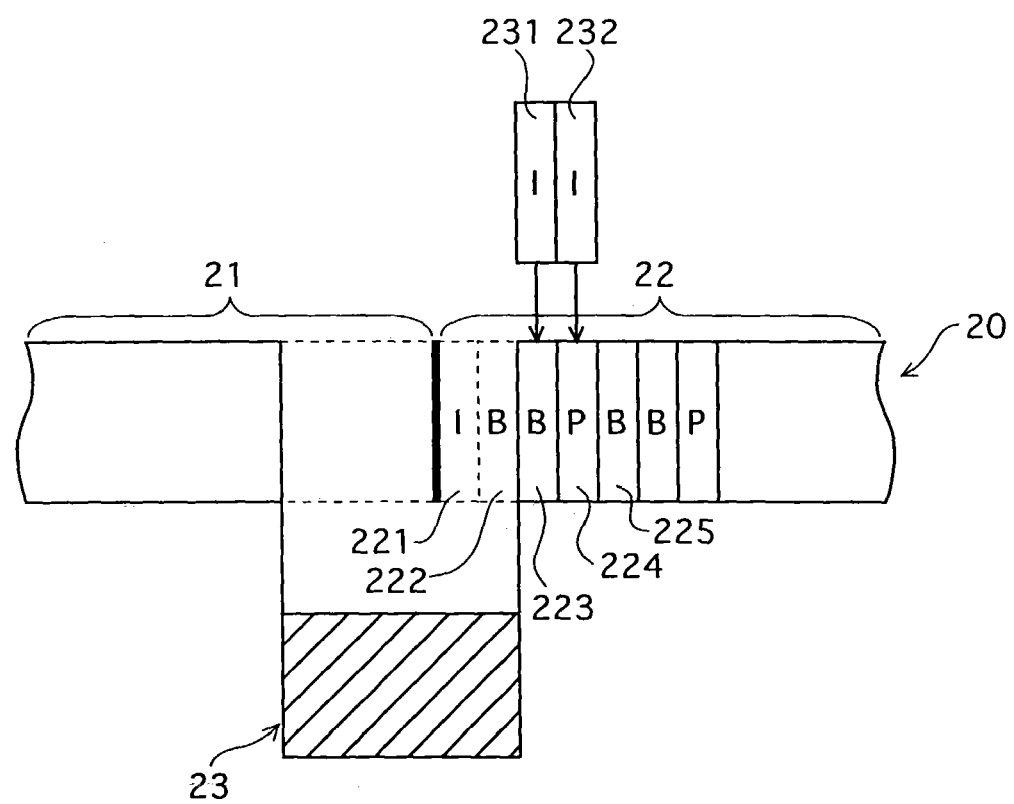
FIG. 3 is a schematic diagram showing a reception state of various types of data in the embodiment.

In FIG. 3, a user terminal receives on-demand video data 23 over a period of time that spans part of two GOPs 21 and 22 that compose broadcast video data 20. The last frame of the on-demand video data 23 overlaps with the second frame, frame 222, of the GOP 22. Frames 223 and 224 are the frames in the broadcast video data 20 that occur directly after resumption. Frame 223 is a B frame whose reference frames for decoding are an I frame 221 that is the top frame of the GOP 22, and the subsequent P frame 224. Furthermore, the reference frame of the P frame 224 for decoding is the I frame 221.

It is necessary to refer to the I frame 221 when decoding the frames 223 and 224, and subsequent frames (frame 225 onwards) cannot be decoded if the frame 224 is not decoded correctly. However, the user terminal 18 does not receive the I frame 221. To solve this problem, at resumption of transmission of broadcast video data 20 to a user terminal 18, a material selection apparatus 15 does not transmit the two top frames 223 and 224 that cannot be decoded correctly, but instead transmits corresponding substitute I frame data 231 and 232.

The user terminal 18 decodes and displays the substitute I frame data 231 and 232 that corresponds to the frames 223 and 234. Frame 225 onwards can be decoded by referring to the data that results from decoding the frame 232, and therefore do not have to be replaced with substitute I frame data.

<Structure of Each Component>

The following describes the structure of the video data transmission/reception system 1 that performs the described processing.

The video data transmission/reception system 1, as shown in FIG. 2, includes a plurality of user terminals 18 which compose a reception side and are connected via the Internal N to a transmission side. The transmission side includes a video camera 11, an edited/broadcast material server 12, a switcher 13, an encoder 14, a material selection apparatus 1.5, an on-demand material server 16, and a distribution server 17.

The video camera 11 provides relay video data which is one type of video data. The video camera 11 is an apparatus that converts optical images incident to an optical lens into electric signals. Video data is either uncompressed or compressed in a format such as DVCPRO or consumer DVD, and outputs the video data to the switcher 13 through a signal line such as an SDI, and SDTI or an IEEE1394.

The edited/broadcast material server 12 provides-video data of a "program" edited at a broadcast station, as one type of broadcast video data. In addition to programs that have been edited, the edited/broadcast material server 12 also holds video data and audio data that are used as material. These are stored on hard disk, magnetic tape or the like, and output to the switcher 13 as necessary.

The switcher 13, which is located in a broadcast center, edits video data obtained from the video camera 11 and the edited/broadcast material server 12, to produce broadcast data, and outputs this broadcast data to the encoder 14, following a predetermined timetable, for broadcasting.

The encoder 14 generates broadcast video data by compressing the broadcast data from the switcher 13 into a format (such as MPEG-4) that is suitable for transmission over the Internet, and outputs the broadcast video data to the material selection apparatus 15. Note that the broadcast data may be already encoded when it is output by the switcher 13. When the broadcast data is unable to be input into the encoder 14 as is, it is decoded by a decoder (not illustrated) and then input into the encoder 14. In addition, the encoder 14 intraframe encodes each frame separately, and outputs the resulting data to the material selection apparatus 15 as substitute I frame data.

Specifically, the encoder 14 applies two different types of encoding processing separately to the input broadcast data, and outputs data resulting from each type of processing as broadcast video data and substitute I frame data, respectively.

Figure 4:
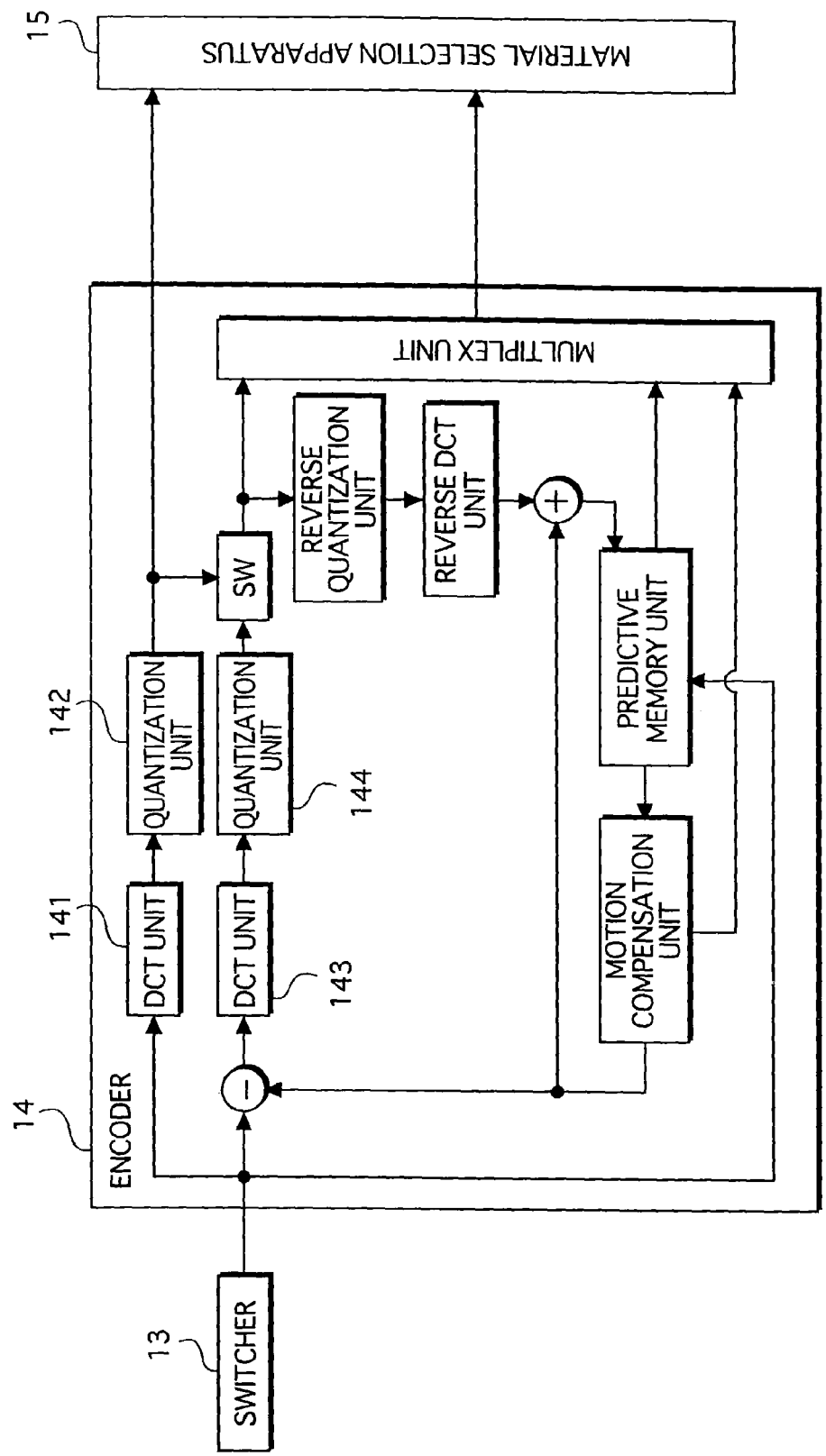
FIG. 4 is a block diagram showing the structure of an encoder in the embodiment.

The structure of the encoder 14 is shown in FIG. 4. The encoder 14 differs from an ordinary encoder in that it has two circuits that each combine a DCT processing unit and a quantization processing unit. A DCT unit 141 and a quantization unit 142 in the first circuit intraframe encode all frames in input broadcast data, and output the resulting data as substitute I frame data. A DCT unit 143 and a quantization unit 144 in the second circuit intraframe encode or interframe encode input broadcast, and output the encoded data as broadcast video data. In other words, the DCT unit 143 and the quantization unit 144 perform the same processing as the DCT unit and quantization unit in an ordinary encoder. The respective encoded data from the first circuit and the second circuit are output to the material selection apparatus 15 with the frames in synchronization.

The on-demand material server 16 holds on-demand video data which it provides to the material selection apparatus 15 in response to user requests. The on-demand video data is stored compressed in MPEG-4 format in the same way as the broadcast video data.

The material selection apparatus 15 receives the broadcast video data and substitute I frame data from the encoder 14 and the on-demand video data from the on-demand material server 16, and sends the received data to the distribution server 17. Here, only the necessary frames of the substitute I frame data are output as required. Processing relating to substitute I frame data performed by the material selection apparatus 15 is described in more detail later.

The distribution server 17 transmits the three types of data (broadcast video data, on-demand video data, and substitute. I frame data) to the user terminals 18 via the Internet N.

Here, the distribution server 17 transmits the broadcast video data simultaneously to all user terminals that are "broadcast targets", following a timetable. A user terminal that is a "broadcast target" is a user terminal that has issued a request to the distribution server 17 for transmission of broadcast video data.

On receiving on-demand video data from the material selection apparatus 15, the distribution server 17 interrupts transmission of broadcast video data to the user terminal from which a request for the on-demand video data originated, and transmits the on-demand video data to the user terminal.

When transmission of the on-demand video data is complete, the distribution server 17 transmits substitute I frame data to the user terminal from which the request for the on-demand video data originated. Next, after the transmission of the substitute I frame data is complete, the distribution server 17 resumes transmission of broadcast video data to the user terminal.

The user terminal 18 transmits a user request to the server 17, and decodes and displays video data that is sent from the distribution server 17 in response to the request. In particular, when resuming reception of broadcast video data after on-demand video data reception, the user terminal 18 receives substitute I frame data, decodes and displays the substitute I frame data, and decodes subsequently received broadcast video data using the decoded substitute I frame data as reference frame data.

<Description of the Main Compositional Elements>

The following describes the main compositional elements (the material selection apparatus 15, the distribution server 17, and the user terminals 18) of the described video data transmission/reception system 1 in further detail.

<Detailed Structure>

The following describes the aforementioned three main compositional elements of the video data transmission/reception system 1 of the present embodiment in further detail with reference to the drawings. The description particularly focuses on processing relating to substitute I frame data.

Figure 5:
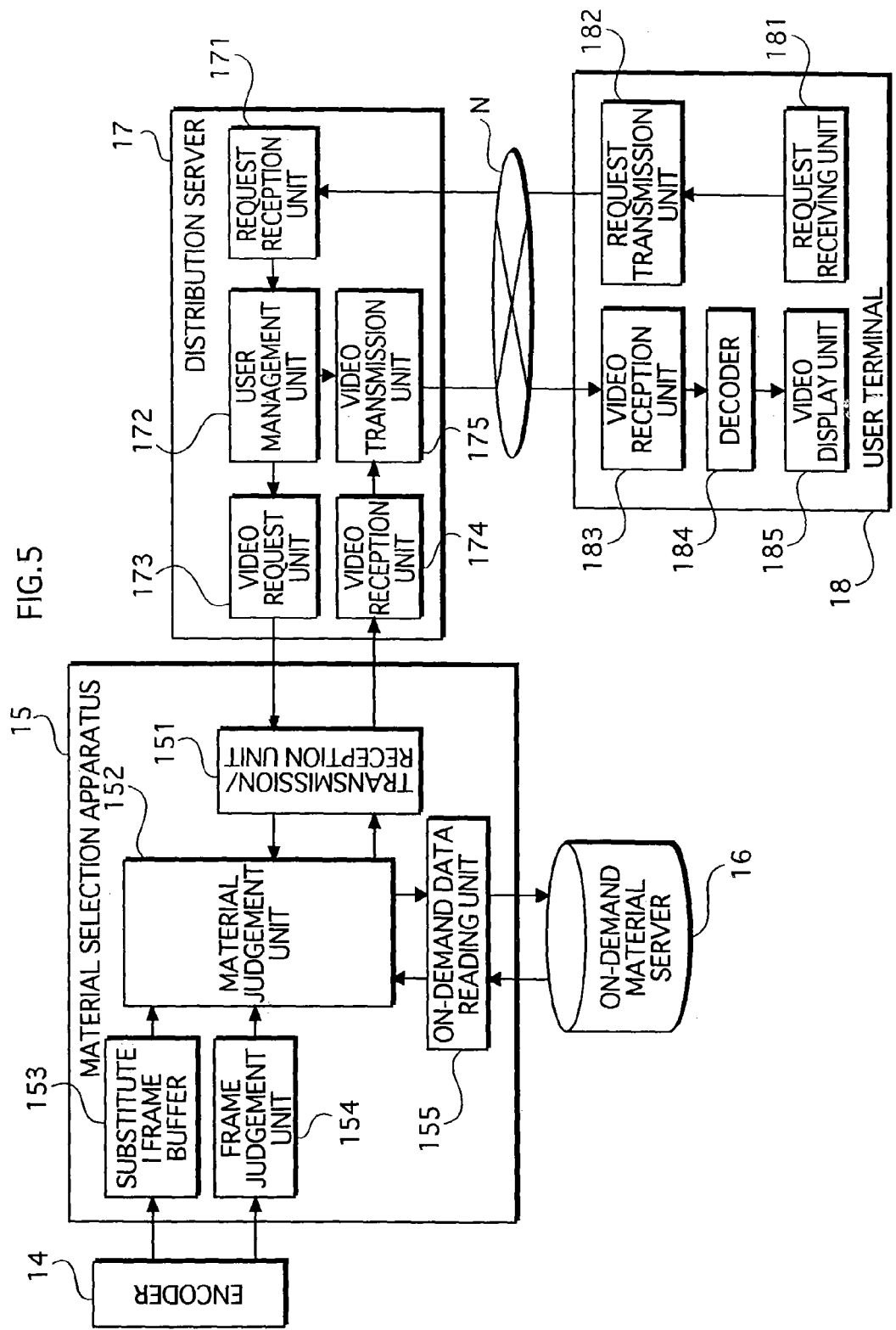
FIG. 5 is a block diagram showing detailed structure of a material selection apparatus, a distribution server, and a user terminal in the embodiment.

FIG. 5 is a block diagram showing the structure of the three main compositional elements.

<Distribution Server 17>

The distribution server 17 includes a request reception unit 171, a user management unit 172, a video request unit 173, a video reception unit 174, and a video transmission unit 175. The following describes processing contents of each component.

The request reception unit 171 receives a request relating to video data transmission (broadcast video data transmission start/end request or on-demand video data transmission request) from the user terminal 18 via the Internet N, and outputs the request to the user management unit 172. The request includes identification information (IP address, etc.) of the request-originating user terminal, and identification information of the requested video data.

The user management unit 172 manages information relating to video data transmission-destination user terminals. The user management unit 172 holds management information that shows identification information about the user terminals to which data is to be transmitted, and type and identification information (in the case of on-demand video data) about data to be sent to each of the user terminals. The user management unit 172 updates the management information in accordance with the contents of requests that are sent from users via the request reception unit 171. Furthermore, the user management unit 172 outputs contents of each received on-demand video data transmission request to the video request unit 173.

The video request unit 173, on receiving a transmission request from the user management unit 172 relating to on-demand video data, instructs the material selection apparatus 15 to read on-demand video data.

The video reception unit 174 receives the various types of video data from the material selection apparatus 15, and sends the video data to the video transmission unit 175. Note that of the video data that is sent from the material selection apparatus 15, the on-demand video data and the substitute I frame data have attached thereto the request-originating user terminal identification information that was included in the request.

Following the management information held by the user management unit 172, the video transmission unit 175 transmits the various types of video data sent from the video reception unit 174, to the user terminal 18. When transmission of the on-demand video data and the substitute I frame data is complete, the video transmission unit 175 sends the transmission destination user terminal identification information to the user management unit 172, and the user management unit 172 updates the contents of the management information for the user terminal from showing to "on-demand video transmission" to showing "broadcast video transmission".

<Material Selection Apparatus 15>

The material selection apparatus 15 includes a transmission/reception unit 151, a material judgement unit 152, a substitute I frame buffer 153, a frame judgement unit 154, and an on-demand data reading unit 155.

The transmission/reception unit 151 receives a transmission request from the distribution server 17 relating to on-demand video data, and outputs the contents of the request (video data identification information and request-originating user terminal identification information) to the material judgement unit 152. In addition, the transmission/reception unit 151 transmits the various types of video data that are output via the material judgement unit 152 to the distribution server 17.

The on-demand data reading unit 155 reads the requested on-demand video data from the on-demand material server 16, and outputs the read on-demand video data to the material judgement unit 152. Furthermore, when outputting the last frame of on-demand video data, the on-demand data reading unit 155 adds information showing that the frame is the last frame.

The frame judgement unit 154 receives broadcast video data from the encoder 14, and outputs the received broadcast video data to the material judgement unit 152. Here, the frame judgement unit 154 analyzes attribute information of each piece of frame data that composes the video data, to obtain the frame type (I, P, or B) and the frame serial number (showing the position of the frame in the video data overall, or the position of the frame in the GOP to which the frame belongs), and outputs this information to the material judgement unit 152 together with the corresponding piece of frame data. This information is referred to judge whether or not it is necessary to output substitute I frame data (this judgement is described later), and to specify the substitute I frame data to be output. Note that it is possible to have the frame judgement unit 154 count the frame serial numbers itself.

The substitute I frame buffer 153 holds several frames' worth of substitute I frame data output by the encoder 14. Furthermore, the substitute I frame buffer 153, which holds a counter, counts the serial numbers of the substitute I frame data, and attaches a serial number to each piece of data (a counting method is used that corresponds to the serial numbers obtained by the frame judgement unit 154). On receiving a substitute I frame data output request from the material judgement unit 152, the substitute I frame buffer 153 outputs substitute I frame data corresponding to the serial numbers attached to the request. Note that when the number of pieces of substitute I frame data in the substitute I frame buffer 153 exceeds a predetermined value, the substitute I frame buffer 153 deletes pieces of substitute I frame data in order from the oldest piece.

The material judgement unit 152 obtains broadcast video data, on-demand video data, and substitute I frame data, outputs the data to the transmission/reception unit 151 as appropriate, thus having the data transmitted to the distribution server 17. The following describes, with reference to the drawings, processing by the material judgement unit 152 during transmission of on-demand video data, and when resuming broadcast video data after completing on-demand video data transmission.

Figure 6:
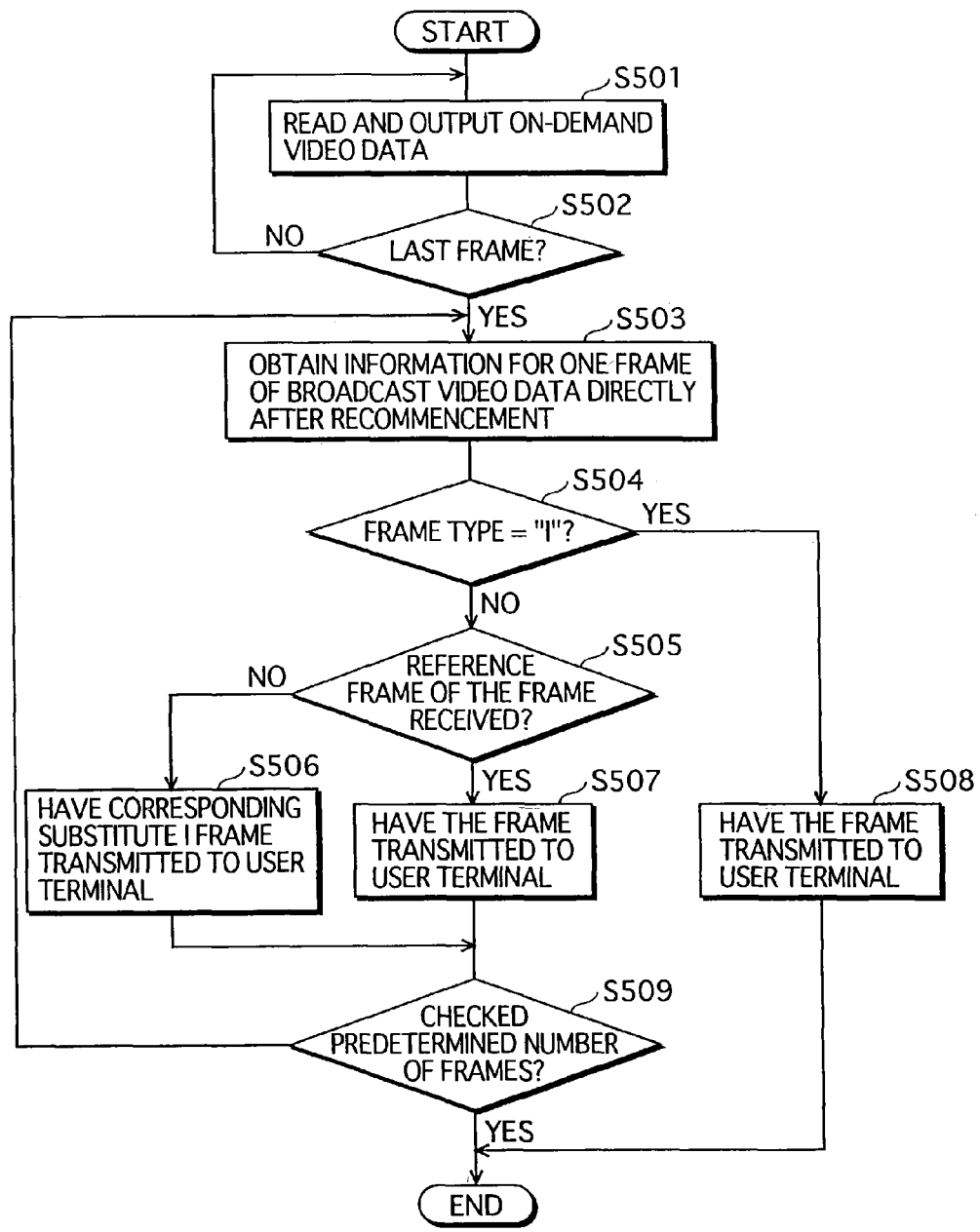
FIG. 6 is a flowchart showing the flow of substitution necessity judgement processing in the embodiment.

FIG. 6 is a flowchart showing the flow of processing by the material judgement unit 152.

When transmitting on-demand video data, the material judgement unit 152, on receiving requested on-demand video data from the on-demand data reading unit 155, outputs the received on-demand video data to the distribution server 17 in parallel with broadcast video data (S501).

On receiving the final frame of the on-demand video data from the on-demand data reading unit 155 (S502: Yes), the material judgement unit 152 obtains the serial number, attribute information and so on about a predetermined number of frames of the broadcast video data that are to be transmitted after the last frame of on-demand video data (S503), and judges, based on the obtained information, whether to replace the frames of broadcast video data with substitute I frame data. The frame structure at the time of encoding the broadcast video data determines how many frames' worth of data the judgement will be performed for. As shown in FIG. 3, the broadcast video data structure used by the present system 1 is a structure in which an I or a P frame appears at a rate of 1 frame in 3, and therefore the material judgement unit 152 judges the necessity of replacement for three frames. Alternatively, the material judgement unit 152 judges all frames until the next I frame appears (start of the next GOP). The material judgement unit 152 may repeatedly judge until an I frame in the next GOP appears if the frame structure (reference relation) is irregular.

If the type of the frame that is being judged is "I" (S504: Yes), it is not necessary to replace the frame with substitute I frame data because the frame and subsequent frames can be decoded correctly by the user terminal 18. Therefore, the material judgement unit 152 notifies the distribution server 17 that replacement is unnecessary, and has the distribution server 17 transmit broadcast video data to the user terminal 18 (S508). The material judgement unit 152 then stops judging the necessity of replacing frames with substitute I frame data.

When the frame being judged is a P or B frame (S504: No), the material judgement unit 152 checks whether the reference frame of the frame has been transmitted to the user terminal 18 (in the case of a B frame, the first of the two reference frames) (S505). Specifically, the material judgement unit 152 compares the serial number of the frame with the serial number of the broadcast video data frame corresponding to the last frame of the on-demand video data, and if the value of the former is greater than that of the latter, this means that the reference frame has reached the user terminal 18. If the reference frame has been received by the user terminal 18 (S505: Yes), it is possible to decode the broadcast video data frame, and therefore the material judgement unit 152 instructs the distribution server 17 to transmit the frame data as is to the user terminal 18 without replacing the frame data with substitute I frame data (S507).

Note that the reference frame serial numbers can be found from the serial number of the frame being judged and the frame structure of the broadcast video data. In the present example of broadcast video data having the frame structure shown in FIG. 3, the reference frame of a P frame is the I or P frame whose serial number is 3 frames before that of the P frame itself. The reference frames of a B frame whose serial number is a multiple of three (frame 223 in FIG. 3) are the I or P frame whose serial number is two before (frame 221 in FIG. 3) and the P frame whose serial number is one after (frame 224 in FIG. 3). For a B frame whose serial number is "a multiple of three −1", the reference frames are the I or P frame whose serial number is one before (frame 221 in FIG. 3) and the P frame whose serial number is two after (frame 224 in FIG. 3).

When the reference frame has not been transmitted (S505: No), the broadcast video data will not be able to be decoded by the user terminal 18, so the material judgement unit 152 reads the corresponding substitute I frame data (having the same serial number) from the substitute I frame buffer 153, sends the read substitute I frame data to the server 17, and has the server 17 transmit the substitute I frame data to the user terminal 18 (S506). Note that since it is necessary to transmit broadcast video data to other user terminals while the substitute I frame data is being transmitted to the user terminal 18, broadcast data is transmitted from the material selection apparatus 15 to the distribution server 17 in parallel with the substitute I frame data.

The material judgement unit 152 repeats the processing at steps S503 to S507 until judgement has been performed for the predetermined number of frames after resumption or until I frame data of the next GOP appears (S509). After the processing shown in FIG. 6 is complete, broadcast video data that succeeds the frame that is subject to the check is transmitted unconditionally.

Note in the preceding description, the material judgement unit 152 judges one frame at a time whether or not to replace the broadcast video data with substitute I frame data, under the assumption that the broadcast video data and the on-demand video data are output to the distribution server 17 in parallel one frame at a time. However, it is possible to judge in advance at the start of on-demand video data transmission whether to substitute or not, and the number and serial numbers of the frames to be substituted, based on information such as the frame structure at the time of encoding and the number of frames in the on-demand video data. Specifically, at the start of transmission of on-demand video data, it is possible to obtain the serial number of the frame of broadcast video data that corresponds to the first frame of on-demand video data, and calculate the serial number of the frame that is transmitted on resumption of transmission by adding the number of frames of the on-demand video data to the obtained serial number. When the frame structure of the broadcast video data is determined in advance as shown in the FIG. 3, frames having a serial number whose value is 3n+1 (n being an integer equal to or greater than 0) as described earlier are either an I frame of a P frame (whether the frame is an I frame or a P frame is determined by the number of frames in the GOP), and frames having other serial numbers are B frames. Therefore, the type of a frame of broadcast video data can be easily judged if the serial number of the frame that occurs at the time of resuming transmission is known.

Note that if the serial numbers of frames to be substituted with substitute I frame data can be predicted in this way, it is possible to generate substitute I frame data only for the frames that are expected to be substituted (in contrast to generating substitute I frame data for all frames in the description above). This enables the processing load for generating substitute I frame data to be lightened, and is particularly effective in a system in which transmission requests for on-demand video data are infrequent.

Furthermore, it is possible to always substitute n frames (n being the frequency with which I or P frames appear) unconditionally (without judgement processing) directly after resumption. This eliminates the load of judging whether to substitute or not. As shown in FIG. 3, the broadcast video data in the present embodiment has a frame structure in which an I or P frame appears every three frames (frequency of appearance of I or P frames=3), and the reference frame of each P frame is the directly preceding I or P frame, while the reference frames of each B frame are the preceding and succeeding I or P frames. In other words, no matter what the type of the frame of broadcast video data directly after resumption is, succeeding frames can be decoded without problem if a maximum of three frames (=frequency of appearance of I or P frames) are substituted with substitute I frames.

Furthermore, if, regardless of the frequency of appearance of I or P frames, all frames after resumption are substituted with substitute I frame data until a P frame appears, the judgement processing load can be lightened because the judgement of whether or not to substitute need only be a check of the type of frame. In other words, if the frame directly after resumption is a P frame, only this P frame is substituted with a substitute I frame. If the frame directly after resumption is a B frame, this B frame and succeeding frames are substituted with substitute I frames until the first subsequent P frame.

<User Terminal 18>

The user terminal 18 receives the various types of video data from the distribution server 17, and decrypts and displays the received video data. The user terminal 18 includes a request receiving unit 181 that receives a request from the user, a request transmission unit 182 that sends the request to the distribution server 17, a video reception unit 183 that receives video data sent from the distribution server 17 in response to the request, a decoder 184 that decodes video data, and a video display unit 185 that displays video that is the result of decoding.

<Flow of Video Data Transmission/Reception Processing>

The following describes exchange of the various types of data between the described main compositional elements and the flow of processing of each component, in video data transmission/reception processing in the present video data transmission/reception system 1.

FIG. 7 is a sequence diagram showing the flow of processing and data exchange between a particular user terminal 18, the distribution server 17, and the material selection apparatus 15 in the video data transmission/reception system 1 of the present embodiment, when the user terminal 18 interrupts reception of broadcast video data to receive on-demand video data, and then resumes receiving broadcast video data.

First, the processing starts when the user terminal 18, which is currently receiving broadcast video data, sends an on-demand video data transmission request to the distribution server 17 (S601). Note that here, although not illustrated, the distribution server 17 is also transmitting the broadcast video data to other user terminals.

The distribution server 17 further sends the request to the material selection apparatus 15.

The material selection apparatus 15, having received the request via the distribution server 17, reads from the on-demand video server 16 on-demand video data that corresponds to the request, and sends the read on-demand video data to the distribution server 17. The distribution server 17 interrupts transmission of broadcast video data to the user terminal 18, and transmits the on-demand video data to the user terminal 18 (S602). Note that here the distribution server 17 continues to transmit broadcast video data to the other user terminals.

On detecting the end of the on-demand video data (S603), the material selection apparatus 15 checks attributes and reference frames of several frames of broadcast video data, from among the broadcast video data that is currently being transmitted to the other user terminals, that are to be transmitted to the user terminal 18 directly succeeding completion of on-demand video data transmission, and judges whether or not it is necessary to transmit substitute I frame data (S604). When the frame type is P or B, and the reference frame of the frame overlaps with the on-demand video data, and is therefore not received by the user terminal 18, the material selection apparatus 15 selects a substitute I frame data, from among held substitute I frames, that corresponds to the frame, and sends the selected substitute I frame to the distribution server 17. The distribution server 17 transmits the substitute I frame data to the user terminal 18 directly after transmitting the last frame of on-demand video data (S605).

The user terminal 18 decodes and displays the substitute I frame data (S606).

After transmission of the substitute I frames (or when transmission of substitute I frames is unnecessary), the distribution server 17 resumes transmission of broadcast video data to the user terminal 18 (S607). The user terminal 18 begins to decode the broadcast video data transmitted directly after resumption, using the decoded substitute I frame data as reference frame data (S608).

<Conclusion>

As has been described, in the video data transmission/reception system 1 of the present embodiment, when transmission of on-demand video data interrupts transmission of broadcast video data from the transmission-side apparatus from the user terminal, the transmission-side apparatus transmits substitute I frame data to the user terminal after completion of transmission of the on-demand video data and before resuming transmission of broadcast video data. The user terminal first decodes the substitute I frame data, displays the resulting video data, then decodes several frames of the broadcast video data that occur directly after resumption, using the decoded substitute I frame as a reference frame, and displays the decoded broadcast video data.

Accordingly, the user terminal is able to correctly decode and display broadcast video data directly after on-demand video data ends.

Note that although the material selection apparatus 15 and the distribution server 17 are described as being separate in the present embodiment, the present invention can also be implemented with these two apparatuses integrated into one apparatus.

Furthermore, the present invention is not limited to using the example of encoded data having a structure and reference rules described in the present embodiment and shown in FIG. 3 where the frequency of appearance of an I or P frame is 3, the reference frame of a P frame is the directly preceding I or P frame, and the reference frames of a B frame are the preceding and succeeding I or P frames. The effects of the present invention can be obtained regardless of the structure and reference rules, as long as it is possible to judge whether or not to substitute frames at transmission resumption as long as the reference frame of each frame of broadcast video data can be specified.

Furthermore, although the encoder 14 of the present embodiment is a special encoder that has a two-circuit DCT-quantization processing structure in which one circuit performs conventional processing (a mixture of intraframe encoding and interframe encoding) and the other circuit performs only intraframe processing, it is possible to structure the system to have two conventional encoders, one generating substitute I frame data and the other generating broadcast video data. This increases the size of the structure because two encoders are required, but enables the present invention to be implemented using only conventional encoders.

Furthermore, data is not limited to being generated in the described manner in which the encoder of the present embodiment is divided into a first and second circuit which have respective DCT units and quantization units and which share data generation by generating substitute I frame data and broadcast video data, respectively. For example, part of the substitute I frame data generated by the first circuit may also be used as broadcast video data, while the second circuit generates only P and B frame data. That is, the top frame of a GOP is intraframe encoded by the first circuit, without being processed by the second circuit, and the intraframe encoded data from the first circuit is output to the material selection apparatus not only as substitute I frame data for the frame, but also as part of the broadcast video data. In addition, the intraframe encoded data is also output to a reverse-quantization unit, and used as reference frame data of subsequent frames. Other frames are encoded by the respective circuits in the same manner as the present embodiment. In this case, processing in an SW is newly required for I frames to output encoded data outputs from the first circuit as broadcast video data. This method lightens the processing load because double processing to intraframe encode the top frame of the GOP respectively in both the circuits is eliminated.

The following is an example of methods of data transmission that may be used instead of simply transmitting data from the distribution server to the user terminals over the Internet as shown in the embodiment.

FIGS. 8A and 8B show examples of video data transmission systems in which video data is transmitted from the router to user terminals 718 (which collectively denotes terminals 718*a*, 718*b*, 718*c*, and 718*d*) via a router. Here, the routers 701 to 703 are multicasters.

FIG. 8A shows the state of broadcast data (shown by the black arrows) being transmitted from the distribution server 717 to the user terminals 718. FIG. 8B shows the state of the terminal 718*a* making a transmission request for on-demand data, and on-demand video data being transmitted in response to the request, from the distribution server 717 to the user terminal 718*a*. After on-demand video data transmission is complete, substitute I frame data (shown by the white arrows) is transmitted to the user terminal 718*a* via the same path as the on-demand video data, and then broadcast video data is again transmitted to the user terminal 718*a* as shown in FIG. 8B.

Note that in this system the processing that relates to substitute I frame data transmission and that is performed by the material selection apparatus 15, the distribution server 17 and so on is the same as in the system 1 in the embodiment.

Furthermore, the embodiment is a video data transmission/reception system in which transmission of on-demand video data interrupts transmission of broadcast video data, but the structure of the system and types of video data in the system of the present invention are not limited to those shown in the embodiment. The present invention applies to a system in which main video data that has been compressed using interframe motion compensation prediction is transmitted from a transmission-side apparatus to a reception apparatus, and in which there are cases of reception of main image data by the reception-side apparatus being interrupted. However, the present invention does not apply to simply interrupting reception, but to the contents of the reference frames that remain in the decoding unit of the reception-side apparatus no longer corresponding to the main video data frames transmitted directly after transmission resumes, due to interrupting reception.

This interruption could occur when substituting part of the main video data with other data as described in the embodiment, or could follow another pattern such other data being transmitted inserted in the main video data, or part (I frame data in particular) of the main video data not being received due to communication failure.

Furthermore, when an interruption occurs in a system in which image data is transmitted as broadcast data following a timetable, transmission of the broadcast data does resume not from the place where the interruption occurred, but skips frames that correspond to the length of the interruption. In this case, even if the reception-side apparatus does not decode other data during the interruption, the content of the reference frames and the main video data will not correspond at resumption. Here, possible causes of interruption are poor communication, and transmission/reception of data other than video data (for example, character data or still image data).

Furthermore, the system of the present embodiment is described as being one in which on-demand video data is transmitted from the distribution server to a user terminal in response to a request from the user terminal, thus interrupting the broadcast video data. However, the system may be a video data transmission/reception system in which the transmission side is the subject, and other video data is inserted into the broadcast video data.

Figure 9:
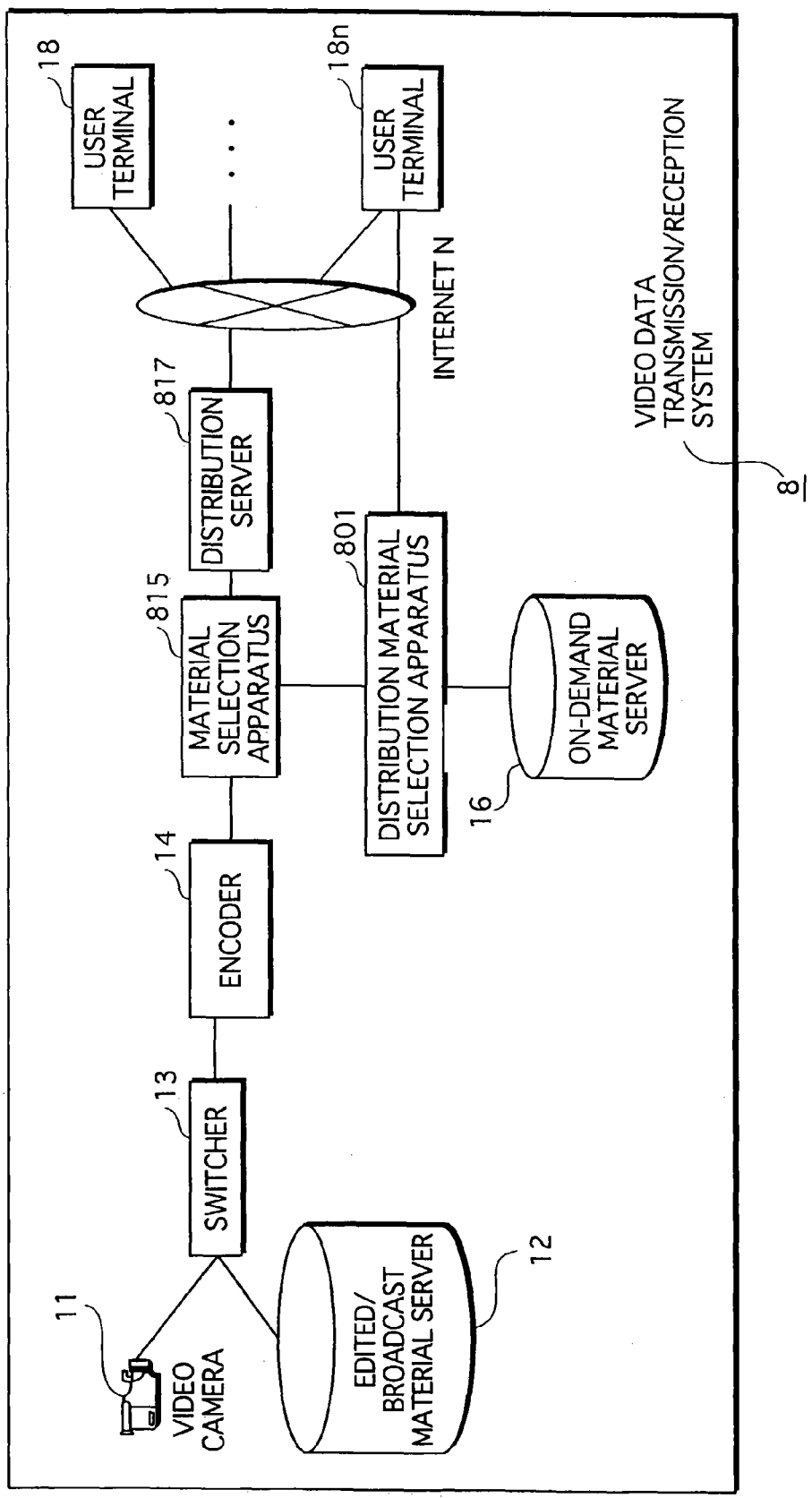
FIG. 9 shows a structure related to the embodiment when transmission/reception of on-demand video data is performed with the transmission side as the subject.

A system shown in FIG. 9 is a video data transmission/reception system 8 in which the transmission-side is the subject, and other video data is inserted into the broadcast video data. A distribution server 817 transmits other video data (for example, image data of commercials to suit the interests and preferences of individual users) appropriately to individual user terminals 18 during transmission of broadcast video data to the user terminals 18. To this end, the system 8 includes a distribution material selection apparatus 801 that selects commercial video data to suit the preferences of individual users. The distribution material selection apparatus 801 obtains information regarding the interests and tastes of the individual user (for example, the age and sex of the user, and products in which he/she is interested) by means of a questionnaire or the like, from the user terminal via the Internet N. This information is used as a basis for selecting commercial video data.

The distribution material selection apparatus 801 may output to the material selection apparatus 815 commercial video data based on a contract between a provider of pay-for-view broadcast video data that is transmitted as a broadcast and a sponsor, and request the material transmission apparatus 815 to transmit the commercial video data to the user terminals. In response, the material selection apparatus 815 outputs the commercial video data to a user terminal that is a commercial transmission-destination, and has the user terminal 18 receive the commercial video data. Then, on detecting the end of the commercial video data, the material selection apparatus 815 performs the process shown in the first embodiment to have necessary substitute I frame data transmitted to the user terminal 18 and have transmission of broadcast video data resumed.

In this way, the effect of the system 1 of the present embodiment can be obtained in a system where interruption and resumption of broadcast video data is performed with the initiative of the transmission-side apparatus. Note that the video data transmitted by the transmission-side apparatuses is not limited to being commercial video data, but may be any kind of video material.

Modification Example

The system 1 in the above-described embodiment enables broadcast video data to be correctly decoded when interruption/resumption of transmission of broadcast video caused by transmission of on-demand video data occurs. In contrast, the following modification example solves a problem that arises in a user terminal that is able to receive a plurality of types of broadcast video data. The problem is that when switching from one type of broadcast video data to another, the user terminal may not be able to correctly decode the broadcast video data after switching until the next GOP, depending on the type of frame of broadcast video data that is received directly after the switch.

The following describes the system of this modification example. Much of the structure of this system is the same as the system of the embodiment, and therefore the following description focuses of the differences.

Figure 10:
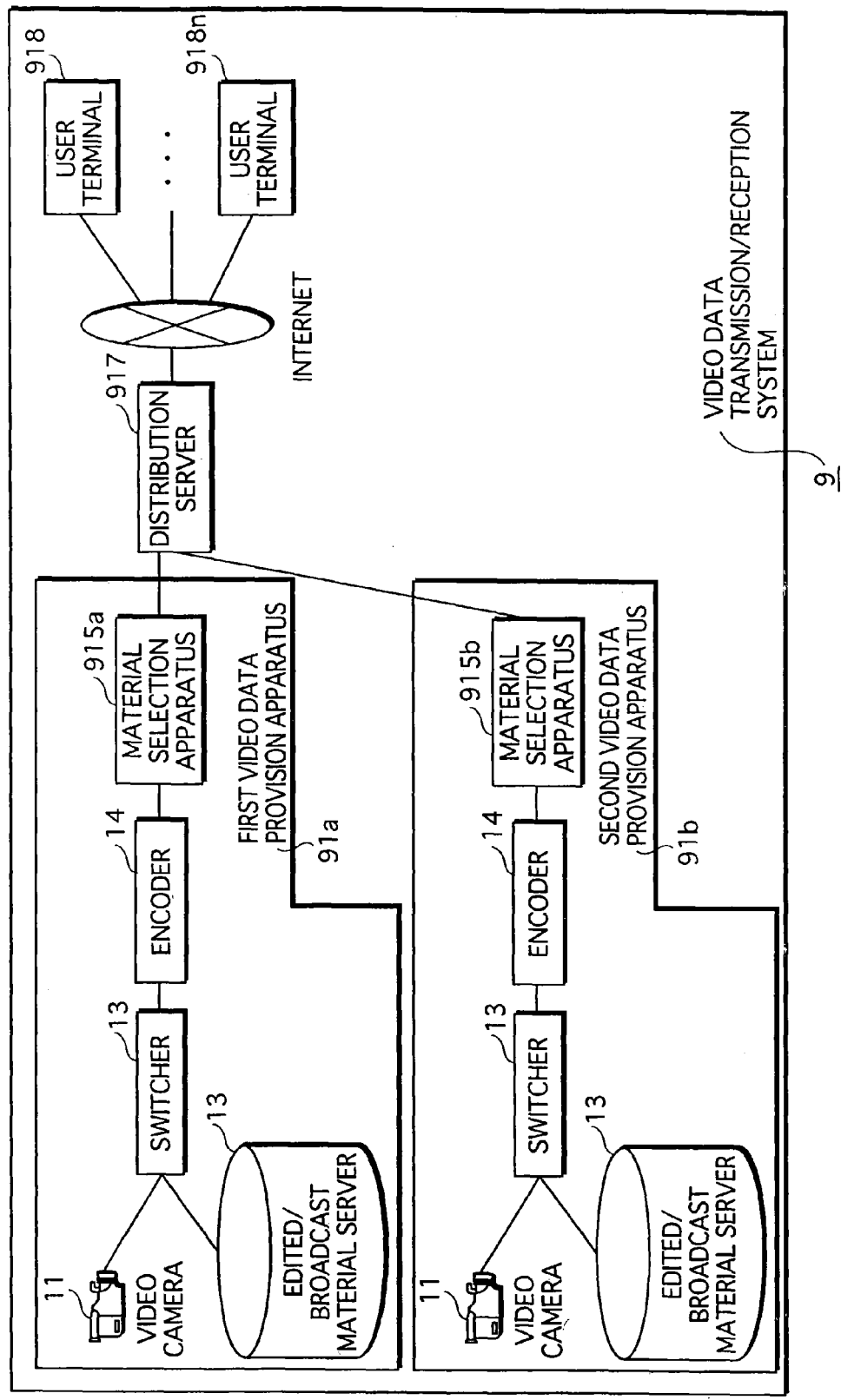
FIG. 10 is a block diagram showing the structure of a modification example of the embodiment.

In a system 9 in FIG. 10, a plurality of types of broadcast video data is provided from a plurality of broadcast video data provision apparatuses 91a and 91b (each comprising a camera and/or a material server, a switcher, and encoder and a material selection apparatus) to a distribution server 917 which transmits video data to user terminals. The two provision apparatuses provide respectively different broadcast video data to the distribution server 917 following predetermined timetables. The distribution server 917 transmits one of the types of broadcast data to a user terminal in response to a request from the user terminal. In other words, the broadcast video data provision apparatuses each correspond to a different channel, and the user switches between the two types of broadcast video data as if switching channels. When switching channels (types of broadcast video data), substitute I frame data is transmitted to the user terminal before starting transmission of broadcast after the switch. This means that broadcast video data can be played back and displayed correctly directly after switching.

<Structure>

In the system 9, processing relating to substitute I frame data transmission at the time of switching broadcast video data is performed by the distribution server 917, and the material selection apparatuses 915a and 915b in the first and second data provision apparatuses 91a and 91b. The following describes processing by these components, omitting descriptions of processing that is common with the system 1.

The distribution server 917 receives broadcast video data from the first and second video provision apparatuses 91a and 91b, and transmits the respective types of broadcast video data to user terminals that wish to receive the types of broadcast video data. The distribution server 917 receives a broadcast video data switch request from the user terminal 918 that is receiving video data provided by the first video data provision apparatus 91a, and notifies the material selection apparatus 915b of the second video data provision apparatus 91b that will provide broadcast video data after the switch. If substitute I frame data is output by the material selection apparatus 915b, the distribution server 917 transmits the substitute I frame data to the user terminal 918 after stopping transmission of the first video data to the user terminal 918, and then starts transmitting second broadcast video data to the user terminal 918. On the other hand, if notification that substitute I frame data is unnecessary is received from the material selection apparatus 915b, the distribution server 917 stops transmitting first video data to the user terminal 918 and starts transmitting second broadcast video data to the user terminal 918.

On receiving notification of a switch request, the material selection apparatus 915b detects the frame to be received by the user terminal 918 directly after switching when switching is performed at this point. Processing after detecting this frame is the same as in the system 1. Specifically, the material selection apparatus 915b judges whether it is necessary to substitute the detected frame and the several frames thereafter with substitute I frame data, and if necessary, reads the substitute I frame data from the I frame buffer, and outputs the frames and the frame serial numbers to the distribution server 917. When it is not necessary to substitute the detected frame with substitute I frame data, the material selection apparatus 915b sends notification to this effect to the distribution server 917. In this case, the material selection apparatus 915b sends the frame serial number to the distribution server 917, and has the distribution server transmit the second broadcast data to the user terminal, starting from the frame that corresponds to the serial number. Furthermore, the distribution server 917 keeps track of the frame serial numbers using the same method as the material selection apparatuses 915*a* and 915*b*.

<Flow of Processing>

The following describes the flow of broadcast video data transmission switch processing in the present video data transmission/reception system 4, with use of a sequence diagram showing control transition and data flow between the main compositional elements.

Figure 11:
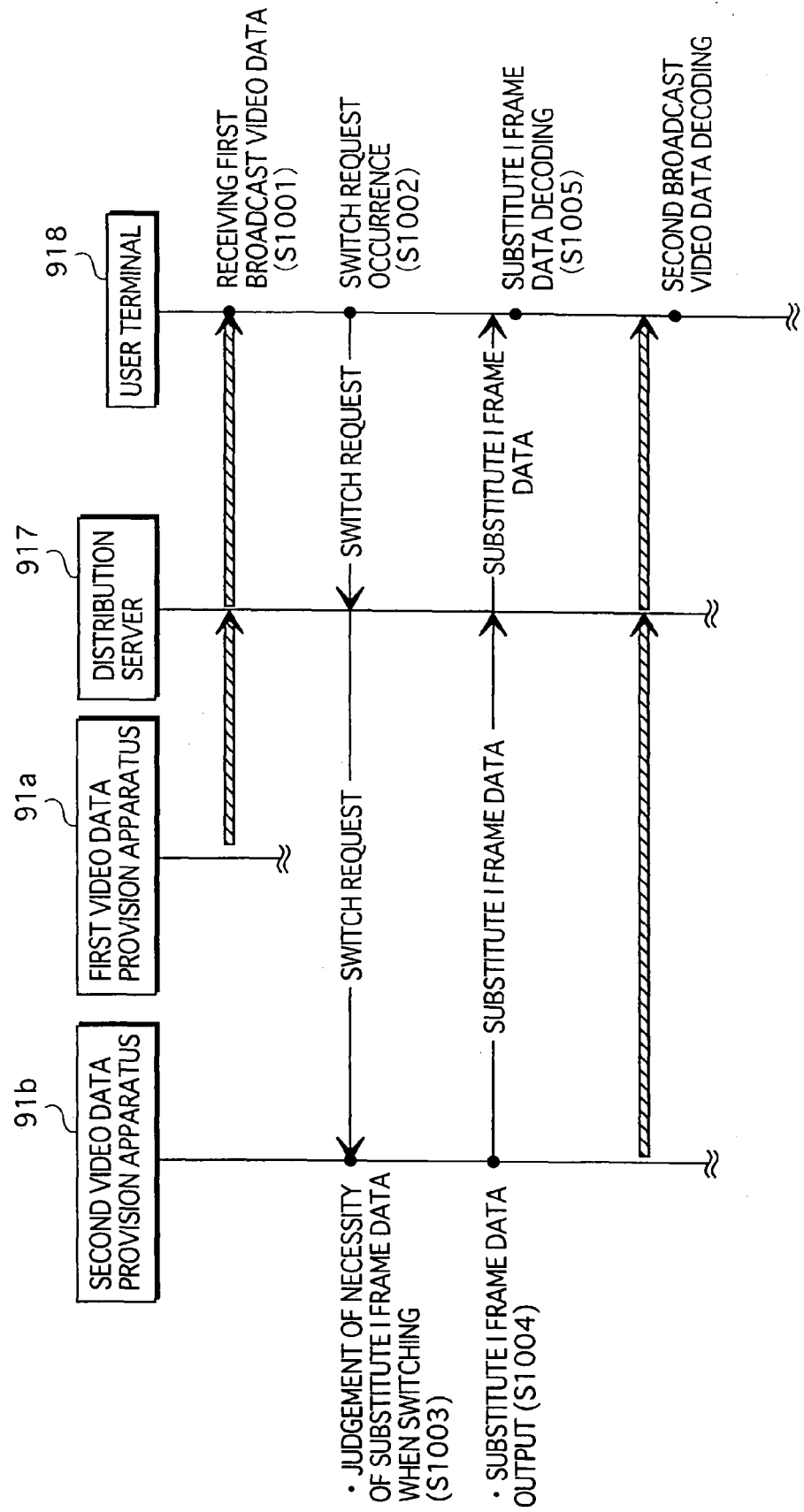
FIG. 11 is a sequence diagram showing the flow of video data transmission/reception processing in the modification example.

FIG. 11 is a sequence diagram showing control transition and data flow between the two broadcast video data provision apparatuses 91*a* and 91*b*, the distribution server 917, and the user terminal 918, in broadcast video data transmission switching processing. This sequence shows a case of video data that is transmitted/received switched from first broadcast video data to second broadcast video data.

First, while the user terminal 918 is receiving first broadcast video data from the first provision apparatus 915*a* via the distribution server 917 (S1001), the user terminal 918, having received an instruction from the user, transmits a request to switch to second broadcast video to the distribution server 917 (S1002).

In response to the switch request the distribution server 917 notifies the second video data provision apparatus 91*b*, which is the provider of the second broadcast video data, that a switch request has been made. In response, the second broadcast video data provision apparatus 91*b* judges whether it is necessary to substitute the frame that the user terminal 918 will receive directly after switching with substitute I frame data (S1003), and when substitution is judged to be necessary, transmits the substitute I frame data to the distribution server 917 (S1004). The distribution server 917 stops transmission of first broadcast video data to the user terminal 918, and transmits the received substitute I frame data to the user terminal 918. The user terminal 918 receives, decodes and displays the substitute I frame data (S1005). Next, the distribution server 917 transmits the second broadcast video data to the user terminal 918, starting from a part that does not need to be substituted with substitute I frame data. The user terminal 918 starts decoding the second broadcast video data using the substitute I frame data decoded at step S1005 as a reference frame (S1006).

In this way, in the system 9 a plurality of video data provision apparatuses 91*a* and 91*b* are connected to the server 917, and provide different broadcast video data. When there is a video data switch request from the user terminal 918, substitute I frame data is provided to the user terminal 918 for a frame of video data that occurs directly after switching. This enables the user terminal to decode and display video data without interruption after switching broadcast video data.

Note that structure for reception of on-demand video data is not included in the modification example shown in FIG. 10, but a system in which substitute I frame data is transmitted/received either after transmission/reception of on-demand video data or when switching video data can be realized by combining the system of the embodiment shown in FIG. 2 with the present modification example.

Modification Example 2

One possible service is one in which, during transmission of particular on-demand data (first on-demand data), transmission of other on-demand data (second on-demand data) interrupts the transmission of the first on-demand data, and then transmission of the first on-demand data resumes. In this case the same problem arises directly after switching from second on-demand data to first on-demand data as in the above-described embodiment. The present modification is a system that deals with this kind of switch.

Figure 12:
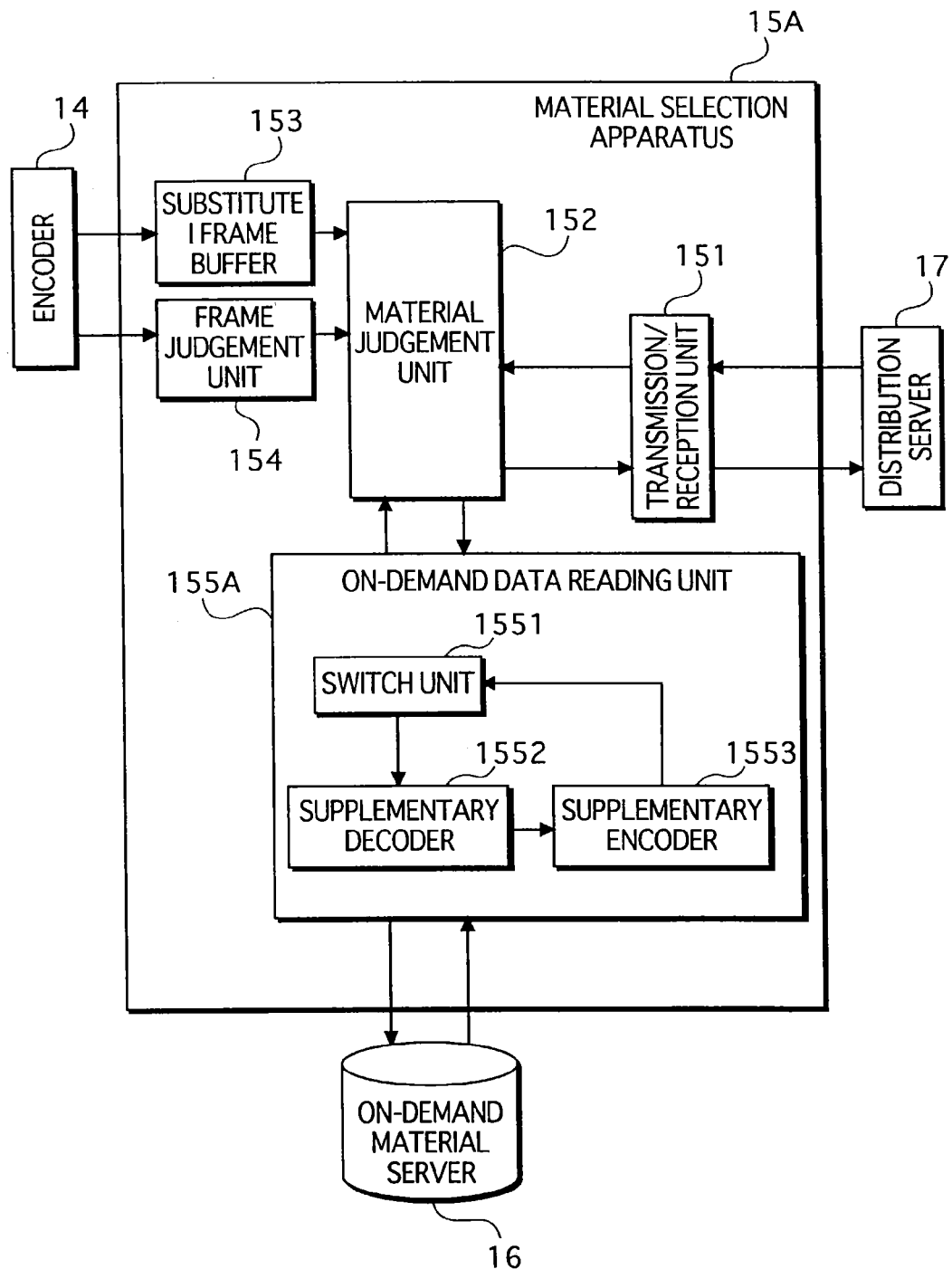
FIG. 12 is a block diagram showing the structure of a material selection apparatus in a video data transmission/reception system in another modification example of the embodiment.

FIG. 12 shows a material selection apparatus 15A in a video data transmission/reception of the present modification. The characteristic compositional element of the present modification is an on-demand data reading unit 155A in the material selection apparatus 15A. In addition to switching on-demand video data that is output to a particular terminal, the on-demand data reading unit 155A outputs substitute I frame data before switching back to first on-demand video data and after switching from second on-demand video data.

It is possible to generate substitute I frame data in advance for all the on-demand data, and store the substitute I frame data in the on-demand material server 16, but this is impractical for such a large amount of data. Here this problem is solved by, before resuming output of first on-demand data, generating several frames of substitute I frame data from the first on-demand data that will be output directly after resumption, and outputting the generated substitute I frame data.

The structure in the on-demand data reading unit 155A that achieves this is a switch unit 1551, an auxiliary decoder 1552, and an auxiliary decoder 1553. Since the on-demand data reading unit 155A performs the same processing as the on-demand reading unit 155 in the embodiment, a description is omitted here.

The switch unit 1551 judges the serial number and frame type of the frame of first on-demand data that will be transmitted directly after transmission resumption, from the frame serial number at the point of switching and the total number of frames in the second on-demand data. Based on the frame type, the switch unit 1551 judges whether it is necessary to generated substitute I frame data (unnecessary for an I frame, necessary for other frame types). If generation is necessary, the switch unit 1551 finds the number of frames to be substituted with substitute I frame data, sends information about the first on-demand data to the auxiliary decoder 1552, and instructs the auxiliary decoder to execute decode processing. Here, the information about the on-demand data includes identification information, the serial number of the frame that occurs directly after resuming transmission, and the above-mentioned number of frames. The procedure for judging whether substitution with substitute I frame data is necessary is the same as that performed by the material judgement unit 152 in the embodiment.

The switch unit 1551 outputs the substitute I frame data, which was obtained as a result of the processing by the supplementary decoder 1552 and the supplementary decoder 1552 in response to the instruction, in place of the frames of the first on-demand data directly after transmission resumption.

On receiving an instruction from the switch unit 1551, the auxiliary decoder 1552 judges, based on the frame serial number information, which GOP in the first on-demand data to decode (the GOP that includes the frame that occurs directly after transmission resumption), and reads only this GOP from the on-demand material server 16 (referring to the identification information at this time). A possible method for making this judgement is to divide the value of the serial number by the number of frames in one GOP, and find the quotient by rounding off to the nearest whole number. If the quotient is considered to be n, the auxiliary decoder 1552 finds the n-th GOP from the top of the first on-demand video data.

In addition, the auxiliary decoder 1552 decodes the read GOP from the top frame to the frames to be transmitted after resumption, attaches a serial number to each of the decoded frames and outputs them to the auxiliary encoder 1553. The auxiliary decoder 1552 also instructs the auxiliary decoder 1553 to generate substitute I frame data from these frames.

The auxiliary encoder 1553 performs intraframe encoding processing for all three frames received from the auxiliary decoder 1552, and outputs the resulting data with the respective frame serial numbers to the switch unit 1551.

<Addition Observations>

Note that although the Internet is given in the embodiment and the modification examples as an example of the communication path used when video data which is encoded by an encoder is distributed via the distribution server of an ISP (Internet Service Provider) or the like, the transmission/reception path used in the present invention is not limited to this, but another communication means such as broadcast waves or CATV may be used. For example, main broadcast program data may be transmitted/received over broadcast waves, and optional on-demand data transmitted/received via a communication line such as the Internet.

Furthermore, although the present invention is a video data transmission/reception system in the embodiment and modification examples, the present invention may be realized by executing a program in a computer. In this case, the program may be recorded on a recording medium.

Furthermore, although the specification for compressing video data is described as MPEG-4 in the embodiment and modification examples, the advantages of the present invention can be achieved in relation to all types of data that are encoded using interframe encoding and motion compensation interframe prediction. For example, the present invention can be applied to video data compressed using another compression method such as MPEG-2.

Furthermore, although on-demand video data is described in the embodiment and modification examples as being transmitted until completion, cases in which the on-demand data transmission is stopped part way through by a request from the user may occur. The present invention is able to deal with such cases. Specifically, processing that is executed when the end of the on-demand data is detected may instead be executed when a request is issued by the reception side apparatus to stop the on-demand data part way through.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A video data transmission/reception system comprising a transmission-side apparatus and a plurality of reception terminals, the transmission-side apparatus transmitting video data that has been compressed using motion compensation interframe prediction, and the reception terminals receiving the video data and decoding the received video data, wherein the transmission-side apparatus includes:

a first encoding unit consisting of a first DCT unit and a first quantization unit, the first encoding unit applying interframe encoding processing to a plurality of frames of moving image data, to generate only interframe frame data for the video data;

a second encoding unit consisting of a second DCT unit and a second quantization unit, the second encoding unit applying in parallel with the encoding processing by the first encoding unit, intraframe encoding processing to a frame of the moving image data, to generate substitute I frame data for the video data;

an encoded video data generation unit connected to the first encoding unit and the second encoding unit to combine the substitute I frame data and the interframe frame data to form the video data; and a transmission unit transmitting the video data and the substitute I frame data to the plurality of reception terminals, wherein when the transmission unit is to resume transmission of the video data to one of the reception terminals after temporarily interrupting transmission of the video data to the reception terminal, the transmission unit checks each of a plurality of frames to determine whether a reference frame for each of the plurality of frames to be transmitted after resuming transmission of the video data has been transmitted or not, and if the reference frame has not been transmitted, transmits the substitute I frame data to the reception terminal for each of the plurality of frames for which the reference frame has not been transmitted before resuming transmission of the video data, the reception terminal, when the transmission unit is to resume the temporarily interrupted transmission of the video data, receives the transmitted substitute I frame data, decodes the received substitute I frame data, and uses the decoded substitute I frame data as reference frame data to decode video data that is received after resumption of transmission, and wherein the first encoding unit and the second encoding unit are included in a same encoder which has one motion compensation unit and one predictive memory unit.

2. The video data transmission apparatus of claim 1 further comprising a substitute I frame buffer connected to the second encoding unit and the transmission unit to store substitute I frame data.

3. The video data transmission apparatus of claim 1 wherein the interframe data comprise P frame data and B frame data.

4. The video data transmission apparatus of claim 1 wherein the transmission-side apparatus further includes a frame judgment unit analyzing the interframe frame data to obtain frame serial numbers.

5. The video data transmission apparatus of claim 4 wherein the transmission unit uses the frame serial numbers to determine whether a reference frame of a frame to be transmitted after resuming transmission of the video data has been transmitted or not.

6. A video data transmission apparatus that transmits video data that has been compressed using motion compensation interframe prediction to a plurality of reception terminals, comprising:

a first encoding unit consisting of a first DCT unit and a first quantization unit, the first encoding unit applying interframe encoding processing to each of a plurality of frames of moving image data, to generate only interframe frame data for the video data;

a second encoding unit consisting of a second DCT unit and a second quantization unit, the second encoding unit applying in parallel with the encoding processing by the first encoding unit, intraframe encoding processing to a frame of the moving image data, to generate substitute I frame data for the video data;

an encoded video data generation unit connected to the first encoding unit and the second encoding unit to combine the substitute I frame data and the interframe frame data to form the video data; and a transmission unit transmitting the video data and the substitute I frame data to the plurality of reception terminals, and when the transmission unit is to resume transmission of the video data to one of the reception terminals after temporarily interrupting transmission of the video data to the reception terminal, the transmission unit checks each of a plurality of frames to determine whether a reference frame for each of the plurality of frames to be transmitted after resuming transmission of the video data has been transmitted or not, and if the reference frame has not been transmitted, transmits the substitute I frame data to the reception terminal for each of the plurality of frames for which the reference frame has not been transmitted before resuming transmission of the video data, wherein the first encoding unit and the second encoding unit are included in a same encoder which has one motion compensation unit and one predictive memory unit.

7. The video data transmission apparatus of claim 6, further comprising:

an option data transmission unit transmitting option video data to the reception terminal, in parallel with the transmission of the video data, wherein the interruption of video data transmission to the reception terminal is caused by the transmission of the option video data.

8. The video data transmission apparatus of claim 7, wherein the option data transmission unit includes an information collection sub-unit operable collecting from each of one or more of the reception terminals, information about preferences of a user of the reception terminal, and based on the collected information, selects contents of option data to be transmitted.

9. The video data transmission apparatus of claim 7, wherein the transmission unit includes a broadcast transmission sub-unit broadcasting a same data to a plurality of transmission destinations; and an individual transmission sub-unit transmitting individual data to an individual transmission destination, wherein the broadcast transmission sub-unit transmits the video data, and the individual transmission sub-unit transmits the substitute I frame data, and the option data transmission unit transmits the option video data in an individual transmission manner.

10. The video data transmission apparatus of claim 9, wherein the transmission unit includes a switch sub-unit exempting a reception terminal to which substitute I frame data or option video data is being transmitted from being a target of transmission of the video data by the broadcast transmission sub-unit.

11. The video data transmission apparatus of claim 7, wherein the option data transmission unit includes an insertion sub-unit transmitting secondary option data part way through transmission of the option data; and a third encoding sub-unit generating option data substitute I frame data that corresponds to at least one frame of the option data starting from a frame that is a first frame after transmission resumption, after transmission of the secondary option data ends and before transmission of the option data resumes, wherein when transmission of the option data is to resume after the transmission of the secondary option data ends, the option data transmission unit transmits the option data substitute I frame data to the reception terminal before transmission of the option data resumes.

12. The video data transmission apparatus of claim 6, wherein the transmission unit determines how many frames of substitute I frame data to transmit to the reception terminal before resuming transmission of the video data, based on a GOP structure of the video data, and in particular, based on a frequency of appearance of frames having an I attribute or a P attribute.

13. The video data transmission apparatus of claim 6 further comprising means for storing substitute I frame data from the second encoding unit for transmission to the transmission unit.

14. A video data transmission apparatus that transmits video data that has been compressed using motion compensation interframe prediction to a plurality of reception terminals, comprising:

a first encoding unit consisting of a first DCT unit and a first quantization unit, the first encoding unit applying intraframe encoding processing to a frame of moving image data, to generate intraframe encoded video data;

a second encoding unit consisting of a second DCT unit and a second quantization unit, the second encoding unit applying interframe encoding processing to a frame of moving image data, to generate interframe encoded video data;

a video data generation unit generating the video data from the intraframe encoded video data and the interframe encoded video data; and a transmission unit transmitting the video data to the plurality of reception apparatuses, wherein when the transmission unit is to resume transmission of the video data to one of the reception terminals after temporarily interrupting transmission of the video data to the reception terminal, the transmission unit checks each of a plurality of frames to determine whether a reference frame for each of the plurality of frames to be transmitted after resuming transmission of the video data has been transmitted or not, and if the reference frame has not been transmitted, transmits the substitute I frame data to the reception terminal for each of the plurality of frames for which the reference frame has not been transmitted before resuming transmission of the video data, and wherein the first encoding unit and the second encoding unit are included in a same encoder which has one motion compensation unit and one predictive memory unit.

15. A video data transmission/reception system comprising a plurality of video data provision apparatuses, a plurality of reception terminals, and a distribution server, the video data provision apparatuses transmitting video data that has been compressed using motion compensation interframe prediction, each reception terminal receiving the video data from any one of the video data provision apparatuses and decoding the received video data, and the distribution server conveying the video data between the video data provision apparatuses and the reception terminals, wherein each video data provision apparatus includes:

a first encoding unit consisting of a first DCT unit and a first quantization unit, the first encoding unit applying interframe encoding processing to each of a plurality of frames of moving image data, to generate only interframe frame data for the video data;
a second encoding unit consisting of a second DCT unit and a second quantization unit, the second encoding unit applying in parallel with the encoding processing by the first encoding unit, intraframe encoding processing to each of a plurality of frames of the moving image data, to generate substitute I frame data; and
an encoded video data generation unit connected to the first encoding unit and the second encoding unit to combine the substitute I frame data and the interframe frame data to form the video data,
wherein the first encoding unit and the second encoding unit are included in a same encoder which has one motion compensation unit and one predictive memory unit, and
the distribution server includes:
a switch request reception unit operable to receive a request from one of the reception terminals to switch video data received by the reception terminal to different video data; and
a switch transmission unit stopping transmission of the video data being transmitted to the request-originating user terminal, checking each of a plurality of frames to determine whether a reference frame for each of the plurality of frames to be transmitted during a start of transmission of the different video data has been transmitted or not, and if the reference frame has not been transmitted, obtaining substitute I frame data, for each of the plurality frames for which the reference frame has not been transmitted, from a video data provision apparatus that is to provide the different video data and transmitting the obtained substitute I frame data to the user terminal, and transmitting the different video data to the user terminal, when the switch request reception unit receives the request from one of the reception terminals.

16. A video data provision apparatus in a video data transmission/reception system that includes a plurality of video data provision apparatuses, a plurality of reception terminals, and a distribution server, the video data provision apparatuses transmitting video data that has been compressed using motion compensation interframe prediction, each reception terminal receiving video data from any one of the video data provision apparatuses, and the distribution server conveying the video data between the video data provision apparatuses and the reception terminals, the video data provision apparatus comprising:
a first encoding unit consisting of a first DCT unit and a first quantization unit, the first encoding unit applying interframe encoding processing to each of a plurality of frames of moving image data, to generate only interframe frame data for the video data;
a second encoding unit consisting of a second DCT unit and a second quantization unit, the second encoding unit applying in parallel with the encoding processing by the first encoding unit, intraframe encoding processing to each of a plurality of frames of the moving image data, to generate substitute I frame data;
an encoded video data generation unit connected to the first encoding unit and the second encoding unit to combine the substitute I frame data and the interframe frame data to form the video data; and
a transmission unit transmitting the video data to the distribution server, and, when one of the reception terminals requests to switch video data being received to the video data being transmitted by the transmission unit, the transmission unit checks each of a plurality of frames to determine whether a reference frame for each of the plurality of frames to be transmitted after the switch has been transmitted or not, and if the reference frame has not been transmitted, transmits the substitute I frame data for each of the plurality of frames for which the reference frame has not been transmitted to the reception terminal via the distribution server, before the switch, and
wherein the first encoding unit and the second encoding unit are included in a same encoder which has one motion compensation unit and one predictive memory unit.

17. A video data transmission/reception method used by a transmission-side apparatus and one of a plurality of reception terminals in a video data transmission/reception system in which the transmission-side apparatus that transmits video data that has been compressed using motion compensation interframe prediction, and the plurality of reception terminals receive the video data and decode the received video data, the method comprising:
a first encoding step, in the transmission-side apparatus, of applying interframe encoding processing to a plurality of frames of moving image data, to generate only interframe frame data for the video data;
a second encoding step, in the transmission-side apparatus, of applying, in parallel with the first encoding step, intraframe encoding processing to each of a plurality of frames of the moving image data, to generate substitute I frame data;
a combining step of combining I frame data and interframe frame data to generate the video data;
a video data transmission step, in the transmission-side apparatus, of transmitting the video data to the one of the plurality of reception terminals;
a transmission interruption step, in the transmission-side apparatus, of interrupting transmission of the video data to the one of the plurality of reception terminals;
a reference frame checking step, in the transmission-side apparatus, of checking each of a plurality of frames to determine whether a reference frame for each of the plurality of frames to be transmitted after resuming transmission of the video data to the one of the plurality of reception terminals has been transmitted or not;
a substitute data transmission step, in the transmission-side apparatus, of transmitting the substitute I frame data to the one of the plurality of reception terminals for each of the plurality of frames for which the reference frame has not been transmitted, before resuming transmission of the video data to the one of the plurality of reception terminals;
a substitute data decoding step, in the reception terminal, of decoding the substitute I frame data;
a video data retransmission step, in the transmission side apparatus, of resuming transmission of the video data to the one of the plurality of reception terminals; and
a video data decoding step, in the reception terminal, of decoding the video data received after resumption of transmission, using data obtained as a result of executing the substitute data decoding step, as reference frame data,
wherein the first encoding step and the second encoding step are executed in a single encoder, the single encoder containing one motion compensation unit, one predictive memory unit, and two encoding units, each of the two encoding units consisting of a DCT unit and a quantization unit.

18. A computer readable medium embodying a executable in a computer, the program causing the computer to perform a video data transmission method used by a transmission-side apparatus in a video data transmission/reception system in which the transmission-side apparatus that transmits video data that has been compressed using motion compensation interframe prediction, and a plurality of reception terminals receive the video data and decode the received video data, the method comprising:

- a first encoding step of applying interframe encoding processing to a plurality of frames of moving image data, to generate the video data;
- a second encoding step of applying, in parallel with the first encoding step, intraframe encoding processing to each of a plurality of frames of the moving image data, to generate substitute I frame data;
- a combining step of combining I frame data and interframe frame data to generate the video data;
- a video data transmission step of transmitting the video data to one of the plurality of reception terminals;
- a transmission interruption step of interrupting transmission of the video data to the one of the plurality of reception terminals;
- a reference frame checking step of checking each of a plurality of frames to determine whether a reference frame for each of the plurality frames to be transmitted after resuming transmission of the video data to the one of the plurality of reception terminals has been transmitted or not;
- a substitute data transmission step of transmitting the substitute I frame data to the one of the plurality of reception terminals for each of the plurality of frames for which the reference frame has not been transmitted, before resuming transmission of the video data to the one of the plurality of reception terminals; and
- a video data retransmission step of resuming transmission of the video data to the one of the plurality of reception terminals,
- wherein the first encoding step and the second encoding step are executed in a single encoder, the single encoder containing one motion compensation unit, one predictive memory unit, and two encoding units, each of the two encoding units consisting of a DCT unit and a quantization unit.

* * * * *